United States Patent
Hasegawa et al.

(10) Patent No.: US 11,870,553 B2
(45) Date of Patent: Jan. 9, 2024

(54) FIBER-OPTIC COMMUNICATION APPARATUS, FIBER-OPTIC COMMUNICATION SYSTEM, AND OPTICAL POWER CONTROL METHOD

(71) Applicant: FUJITSU LIMITED, Kawasaki (JP)

(72) Inventors: Makoto Hasegawa, Sapporo (JP); Atsushi Kodama, Kawasaki (JP); Norifumi Shukunami, Yokohama (JP); Tomoaki Takeyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/870,276

(22) Filed: Jul. 21, 2022

(65) Prior Publication Data
US 2022/0368447 A1 Nov. 17, 2022

(30) Foreign Application Priority Data
Jun. 10, 2022 (JP) ................. 2022-094096

(51) Int. Cl.
*H04J 14/02* (2006.01)
*H04B 10/2507* (2013.01)
*G02B 6/42* (2006.01)

(52) U.S. Cl.
CPC ........ *H04J 14/0221* (2013.01); *G02B 6/4286* (2013.01); *H04B 10/2507* (2013.01); *H04J 14/0213* (2013.01)

(58) Field of Classification Search
CPC .............. H04B 10/2507; H04J 14/0213; H04J 14/0221; G02B 6/4286
USPC ........................................................ 398/79
See application file for complete search history.

(56) References Cited

U.S. PATENT DOCUMENTS

| | | | | |
|---|---|---|---|---|
| 8,965,202 B2* | 2/2015 | Sone | ................... | H04J 14/0201 398/25 |
| 9,083,459 B2* | 7/2015 | Oda | ..................... | H04B 10/572 |
| 9,300,426 B2* | 3/2016 | Matsukawa | ......... | H04J 14/0221 |
| 9,923,632 B2* | 3/2018 | Yamauchi | ........ | H04B 10/07957 |
| 2004/0091263 A1* | 5/2004 | Sakamoto | ............ | H04B 10/294 398/45 |
| 2009/0016727 A1* | 1/2009 | Ueki | ................ | H04B 10/07955 398/79 |
| 2009/0279888 A1* | 11/2009 | Butler | ................. | H04J 14/0221 398/37 |

(Continued)

FOREIGN PATENT DOCUMENTS

| | | |
|---|---|---|
| JP | 2012-65060 | 3/2012 |
| JP | 2015-126487 | 7/2015 |

OTHER PUBLICATIONS

Wang et al; Low-cost WDM Wavelength Channel Optical Power Monitoring based on PAM4 Optical Labels; 2021; IEEE; pp. 1-3. (Year: 2021).*

*Primary Examiner* — Amritbir K Sandhu
(74) *Attorney, Agent, or Firm* — STAAS & HALSEY LLP

(57) ABSTRACT

A fiber-optic communication apparatus includes an optical monitor that monitors a WDM signal in which optical signals of multiple channels are multiplexed, a processor that calculates a control value for controlling an optical power of the WDM signal, based on a power spectrum detected by the optical monitor, in a unit interval of frequency narrower than a channel bandwidth of the WDM signal, and an optical power adjusting mechanism that adjusts the optical power of the WDM signal in the unit interval of frequency based on the control value.

16 Claims, 19 Drawing Sheets

(56) References Cited

U.S. PATENT DOCUMENTS

| | | | |
|---|---|---|---|
| 2010/0129081 A1* | 5/2010 | Onaka | H01S 3/13013 359/334 |
| 2010/0239260 A1* | 9/2010 | Oikawa | H04J 14/0224 398/81 |
| 2012/0063771 A1 | 3/2012 | Sugaya et al. | |
| 2015/0188638 A1 | 7/2015 | Tanaka et al. | |
| 2015/0381276 A1* | 12/2015 | Saito | H04B 10/0799 398/34 |
| 2016/0204876 A1* | 7/2016 | Kamura | H04J 14/0227 398/79 |
| 2016/0261362 A1* | 9/2016 | Ojima | H04B 10/572 |
| 2016/0315729 A1* | 10/2016 | Tsuzuki | H04J 14/0212 |
| 2018/0205485 A1* | 7/2018 | Yuki | H04J 14/0275 |
| 2019/0349113 A1* | 11/2019 | Komiya | H04J 14/0221 |
| 2020/0052794 A1* | 2/2020 | Noguchi | H04J 14/0298 |
| 2022/0368447 A1* | 11/2022 | Hasegawa | G02B 6/4286 |

\* cited by examiner (A) 50 GHz CHANNEL SPACING/BANDWIDTH (B) 150 GHz CHANNEL SPACING/BANDWIDTH (A) 50 GHz SIGNAL SPECTRUM AT RECEIVER SIDE (B) 150 GHz SIGNAL SPECTRUM AT RECEIVER SIDE (A) POWER SPECTRUM OUTPUT FROM PREAMPLIFIER (B) ATTENUATION AT DROP-SIDE WSS (C) POWER SPECTRUM OUTPUT FROM DROP-SIDE WSS (A) POWER SPECTRUM INCIDENT ONTO OCM (B) CHANNEL POWERS DETECTED BY OCM (A) CURRENT ATT PARAMETERS OF WSS (B) $\Delta P(\lambda i)$ ADDED TO RESPECTIVE SUBCHANNELS (A) POWER CONTROLLED SPECTRUM
(DIVIDED FREQUENCY BANDWIDTH OF 50 GHz)

(B) POWER CONTROLLED SPECTRUM
(DIVIDED FREQUENCY BANDWIDTH OF 25 GHz)

(A) POWER SPECTRUM OF WDM SIGNAL INCIDENT ONTO UPSTREAM OCM (B) CHANNEL POWERS DETECTED AT UPSTREAM OCM (C) POWER SPECTRUM INTEGRATED IN FREQUENCY DIRECTION (A) POWER SPECTRUM INCIDENT ONTO DOWNSTREAM OCM (B) CHANNEL POWERS DETECTED AT DOWNSTREAM OCM (C) POWER SPECTRUM INTEGRATED IN FREQUENCY DIRECTION (A) POWER SPECTRUM INTEGRATED IN FREQUENCY DIRECTION AT DOWNSTREAM (B) SPECTRUM INFORMATION TRANSFERRED FROM UPSTREAM (C) ATTENUATION AT DROP-SIDE WSS

FIBER-OPTIC COMMUNICATION APPARATUS, FIBER-OPTIC COMMUNICATION SYSTEM, AND OPTICAL POWER CONTROL METHOD

CROSS-REFERENCE TO RELATED APPLICATIONS

This application is based upon and claims priority to earlier Japanese Patent Application No. 2022-94096 filed Jun. 10, 2022, which is incorporated herein by reference in its entirety.

FIELD

The present documents relate to a fiber-optic communication apparatus, a fiber-optic communication system, and an optical power control method.

BACKGROUND

In a wavelength division multiplexing (WDM) fiber-optic communication system, ninety-six-channel signal transmission has been put into practical use in each of the 1550 nm band (C band) and the 1590 nm band (L band). The bandwidth of each of the C band and the L band is 4.8 THz (about 40 nm), and the channel spacing and the channel bandwidth are 50 GHz (about 0.4 nm) for 96-channel transmission. With the 50-GHz channel spacing/bandwidth, signal transmission is carried out at a bit rate of 100 Gbps and a baud rate of 32 Gigabaud (GBd). The optical powers of the respective channels are controlled in advance by an upstream fiber-optic communication apparatus so as to prevent optical power deviation between the channels. This is because the inter-channel power deviation causes the optical signal-to-noise ratio (OSNR) to decrease at these channels with lower power, and causes deterioration of the signal quality.

A WDM signal containing power-controlled channels passes through a post-amplifier, a fiber-optic transmission line in which one or more inline amplifiers are provided, and a pre-amplifier, and is received at a downstream fiber-optic communication apparatus. At the downstream, optical power deviation has occurred again between channels in the received WDM signal due to wavelength-dependent optical loss and induced Raman scattering in the fiber-optic transmission line, and due to the wavelength (or frequency) characteristics of the amplifiers' gains. Accordingly, the downstream fiber-optic communication apparatus performs power control so that the optical powers of the respective channels approach the target power level, and that the inter-channel power deviation is reduced.

In recent years, the baud rate of symbols has been increasing along with the increase in the bit rate per channel. For example, 1.2 Tbps signal transmission results in 130 GBd, and 150 GHz channel spacing/bandwidth is being discussed.

Even if the optical powers of the respective channels are controlled at both the transmitter side and the receiver side, power deviation tends to remain within the channel band (referred to as "intra-band power deviation") in signal transmission of 50 GHz channel spacing and bandwidth. With expansion of channel spacing and the channel bandwidth to 150 GHz, the intra-band power deviation further increases because of the wider bandwidth. The increase in the intra-band power deviation will cause a transmission penalty at the receiver side, and extension of the transmission distance may be hindered. It is desired for WDM fiber-optic transmission to suppress the optical power deviation from occurring between channels and within the band of each channel.

Related art documents known to the inventors are
Patent Document 1: JP Patent Application Laid-open Publication No. 2012-65060; and
Patent Document 2: JP Patent Application Laid-open Publication No. 2015-126487.

SUMMARY

In an embodiment, a fiber-optic communication apparatus includes
an optical monitor that monitors a WDM signal in which optical signals of multiple channels are multiplexed,
a processor that calculates a control value for controlling an optical power of the WDM signal, based on a power spectrum detected by the optical monitor, in a unit interval of frequency narrower than a channel bandwidth of the WDM signal, and
an optical power adjusting mechanism that adjusts the optical power of the WDM signal in the unit interval of frequency based on the control value.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

EMBODIMENT(S)

Figure 1:
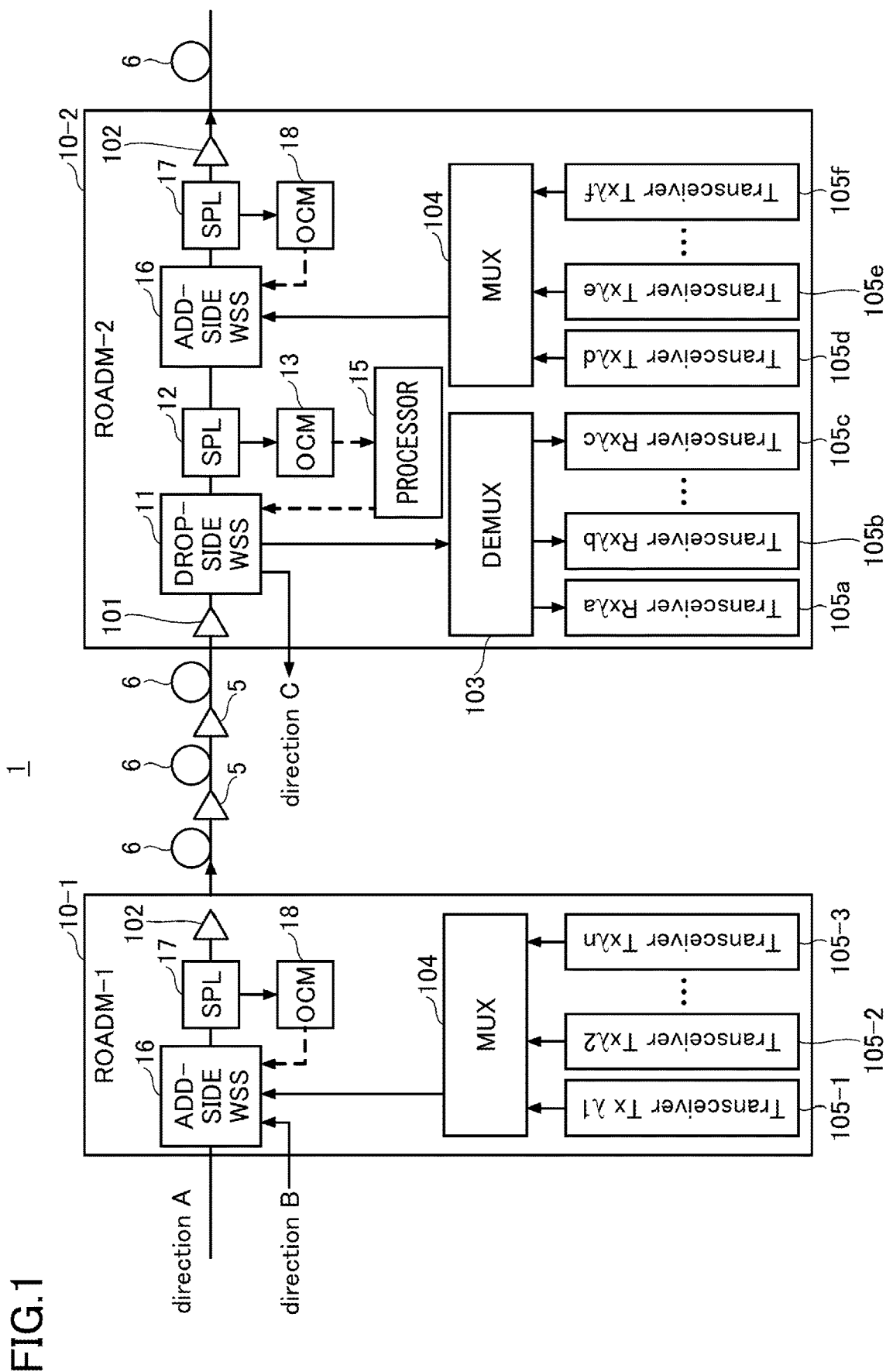
FIG. 1 is a schematic diagram of a fiber-optic communication system according to a first embodiment.

In the embodiment, power deviation between channels (referred to as inter-channel power deviation) is suppressed, and intra-band power deviation of each channel is also reduced in WDM fiber-optic communication. To achieve this, the optical power is controlled in a unit interval of frequency narrower than the channel bandwidth used in the WDM fiber-optic communication system. The optical power can be controlled using a power control mechanism of a component used in the fiber-optic communication apparatus, such as the attenuation mechanism of a wavelength selective switch (WSS), the variable attenuation mechanism of a dynamic gain equalizer, or the output level adjusting mechanism of a wavelength blocker capable of controlling the optical output level at a variable bandwidth.

Inter-channel power deviation occurring in the fiber-optic transmission line or an erbium-added fiber amplifier (EDFA) is conventionally monitored at a downstream fiber-optic communication apparatus, and the amount of WSS attenuation is controlled by an upstream fiber-optic communication apparatus so that the power level monitored at the downstream apparatus becomes flat. However, at a higher baud rate of, for example, 130 GBd, the channel bandwidth is expanded to 150 GHz. If a Raman amplifier is used to amplify the optical signal of such a wide wavelength range, ripples are generated corresponding to the wavelength of the pump light, and the spectrum tilt occurring within the band cannot be negligible any longer. Furthermore, even with a conventional 50 GHz bandwidth, the influence of the spectrum tilt occurring within the channel band may grow, depending on the state of the fiber-optic transmission line.

To prevent the adverse influence of inter-channel and intra-band power deviation, the embodiments control the optical power in a unit interval of frequency narrower than the channel bandwidth of the WDM fiber-optic communication system. More specifically, a fiber-optic communication apparatus of an embodiment detects the power spectrum of the WDM signal in which a plurality of channels are multiplexed, and calculates a control value for adjusting the power level of the WDM signal, in the unit interval of frequency narrower than the channel bandwidth of the WDM signal, based on the detected power spectrum. The power level of the WDM signal is adjusted in the unit interval of frequency narrower than the channel bandwidth, based on the calculated control value. In the following description, the unit interval of frequency narrower than the channel bandwidth may be referred to as a "subchannel" for convenience. It should be noted that the "subchannel" is not a unit of signal transmission, but a unit of optical power control. For instance, the optical power level is controlled in a frequency interval of 25 GHz or 12.5 GHz for a WDM signal of 50 GHz channel bandwidth. For a WDM signal of 150 GHz channel bandwidth, the optical power level may be controlled in a unit frequency interval of 50 GHz, 25 GHz, 12.5 GHz, or narrower, for each of the multiplexed channels. In the following, the same components may be designated by the same reference numerals and redundant description is not repeated.

First Embodiment

FIG. 1 is a schematic diagram of a fiber-optic communication system 1 according to the first embodiment. The fiber-optic communication system 1 includes a first fiber-optic communication apparatus 10-1, and a second fiber-optic communication apparatus 10-2 which are connected via a fiber-optic transmission line 6. Inline amplifiers 5 may be inserted in the fiber-optic transmission line 6. The fiber-optic communication apparatuses 10-1 and 10-2 are, for example, reconfigurable optical add and drop multiplexers (ROADMs), and are labeled as "ROADM-1" and "ROADM-2", respectively, in the figure. Although the configuration of only the transmission side of the fiber-optic communication apparatus 10-1 is illustrated in the figure for convenience of illustration, the fiber-optic communication apparatuses 10-1 and 10-2 have the same structure.

In the first embodiment, the output of the drop-side WSS is monitored by the fiber-optic communication apparatus 10-2 at the receiving side, and the optical power of each channel is controlled in a unit interval of frequency narrower than the channel bandwidth of the system, based on the monitoring result. The fiber-optic communication apparatus 10-2 has a preamplifier 101, a drop-side WSS 11, an optical splitter (denoted as "SPL" in the FIG. 12, an optical monitor 13, and a processor 15. The optical monitor 13 is, for example, an optical channel monitor (OCM) capable of monitoring optical power and wavelength in real time. The fiber-optic communication apparatus 10-2 also has an add-side WSS 16, an optical splitter 17, an optical monitor 18, and a post-amplifier 102. The fiber-optic communication apparatus 10-1 has a drop-side WSS 16, an optical splitter 17, an optical monitor 18, and a post-amplifier 102 in its transmission part.

Transmitter circuits of transceivers 105-1, 105-2, ..., 105-n, which handle optical signals of different wavelengths $\lambda 1$, $\lambda 2$, ..., $\lambda n$ and labeled as "Transceiver Tx $\lambda 1$", "Transceiver Tx $\lambda 2$", ..., "Transceiver Tx $\lambda n$" in the figure, are connected to the fiber-optic communication apparatus 10-1. The optical signals output from the transceivers 105-1, 105-2, ..., 105-n are multiplexed by a multiplexer 104. The multiplexed optical signal is input to the add-side WSS 16 and is multiplexed with other optical signals coming from direction A and from direction B.

The WDM signal output from the add-side WSS 16 is split by the optical splitter 17, a portion of which is input to the optical monitor 18, while the remaining portion of the WDM signal is input to the post-amplifier 102. The optical monitor 18 monitors the optical powers of the respective channels (that is, wavelengths), and feeds back the monitoring result to the add-side WSS 16. In the figure, solid arrows represent optical signal lines, and dashed arrows represents electrical signal lines. The add-side WSS 16 has an attenuation mechanism, and controls the optical powers of the respective channels, based on the monitoring result, so that the optical powers of the channels approach a target value.

The post-amplifier 102 amplifies and transmits the power-adjusted WDM signal to the fiber-optic transmission line 6. The inline amplifier 5 amplifies the WDM signal whose power has attenuated through the fiber-optic transmission line 6. The WDM signal having travelled through the fiber-optic transmission line 6 is received at the fiber-optic communication apparatus 10-2.

The preamplifier 101 of the fiber-optic communication apparatus 10-2 of the downstream side amplifies the WDM signal having attenuated through the fiber-optic transmission line 6. The post-amplifier 102, the preamplifier 101, and the inline amplifier 5 may be either Raman amplifiers or EDFAs. The output light of the preamplifier 101 is incident to the drop-side WSS 11, at which a portion of the WDM signal is output to direction C, and another portion of the WDM signal is supplied to the optical demultiplexer 13 and demultiplexed. The demultiplexed optical signals are provided to corresponding transceivers 105a, 105b, and 105c (labelled as "Transceiver Rx λ a", "Transceiver Rx λb", and "Transceiver Rx λc" in the figure). The rest of the WDM signal is incident onto the optical splitter 12.

A portion of the output of the optical splitter 12 is supplied to the optical monitor 13, and the other portion is input to the add-side WSS 16. The optical monitor 13 monitors the optical powers of the respective channels (wavelengths). The monitoring result is input to the processor 15. The processor 15 determines optical power control values in a unit interval of frequency narrower than the channel bandwidth, based on the monitoring result, for each of the channels. The determined control values are supplied from the processor 15 to the drop-side WSS 11. The control values are, for example, attenuation amounts of the drop-side WSS 11, the amounts of compensation for optical loss, or output level control values of the drop-side WSS 11. The drop-side WSS 11 adjusts the optical power level of the input WDM signal in the unit interval of frequency narrower than the channel bandwidth, based on the control values, to bring the optical power of the input WDM signal closer to the target value.

The WDM signal whose optical power has been controlled by the drop-side WSS 11 in a unit interval of frequency narrower than the channel bandwidth is distributed to the associated paths, including direction C, the demultiplexer 103, and the add-side WSS 16. The WDM signal input to the add-side WSS 16 is multiplexed with transmission signals of other wavelengths, and transmitted to the fiber-optic transmission line 6 in the downstream direction. The operation and configuration of the transmitter section of the fiber-optic communication apparatus 10-2 are the same as the operation and the configuration of the transmitter section of the fiber-optic communication apparatus 10-1, as has been described above. The attenuation functions of the drop-side WSS 11 and the add-side WSS 16 may be implemented by a microprocessor and a voltage generator provided in the WSSs.

Figure 2:
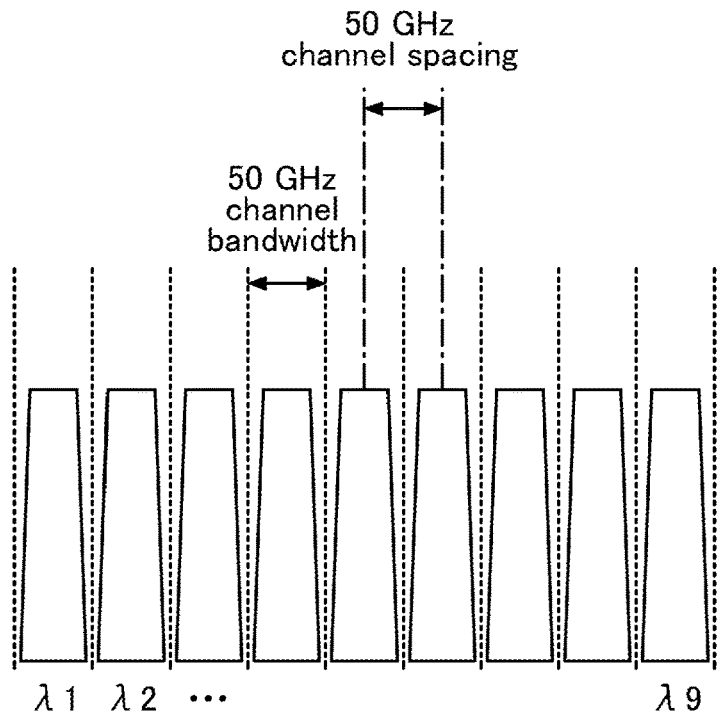
FIG. 2 illustrates examples of channel spacing and channel bandwidth in WDM transmission.
Figure 2:
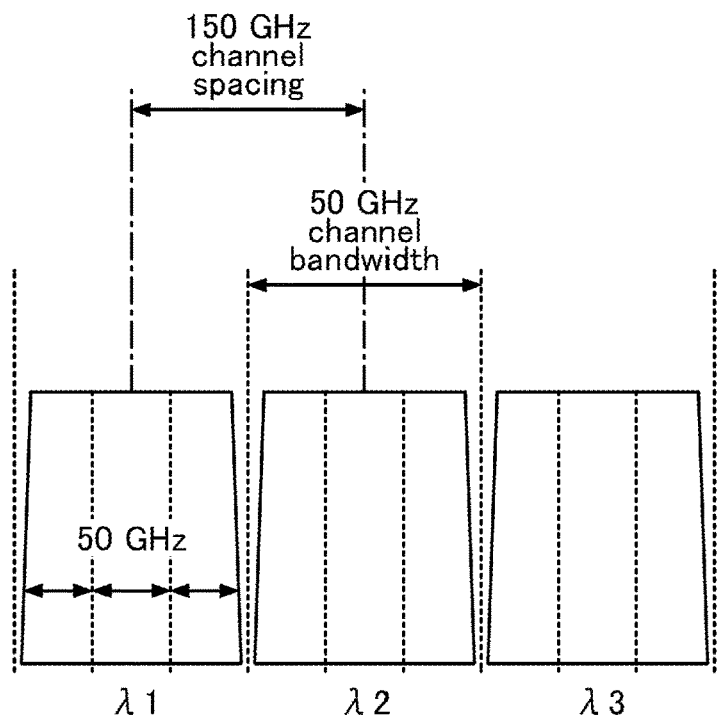

FIG. 2 illustrates examples of channel spacing and channel bandwidth in WDM transmission. FIG. 2 (A) illustrates a signal spectrum with channel spacing and channel bandwidth of 50 GHz. FIG. 2 (B) illustrates a signal spectrum with channel spacing and channel bandwidth of 150 GHz. At both 50 GHz and 150 GHz channel bandwidths, the signal spectrum does not have a perfect square waveform, but has a trapezoidal waveform. By dividing the 150 GHz bandwidth into, for example, three in the frequency direction, the central subchannel has a rectangular waveform, and has a spectral density higher than that of the subchannels at both sides. Thus, the spectral density is improved, compared with the signal transmission of 50 GHz bandwidth. The 50 GHz channel bandwidth of FIG. 2 (A) may also be divided into multiple frequency regions. For example, the optical power may be controlled for the 50 GHz bandwidth channel in a unit interval of 12.5 GHz by dividing the bandwidth into four frequency regions.

Figure 3:
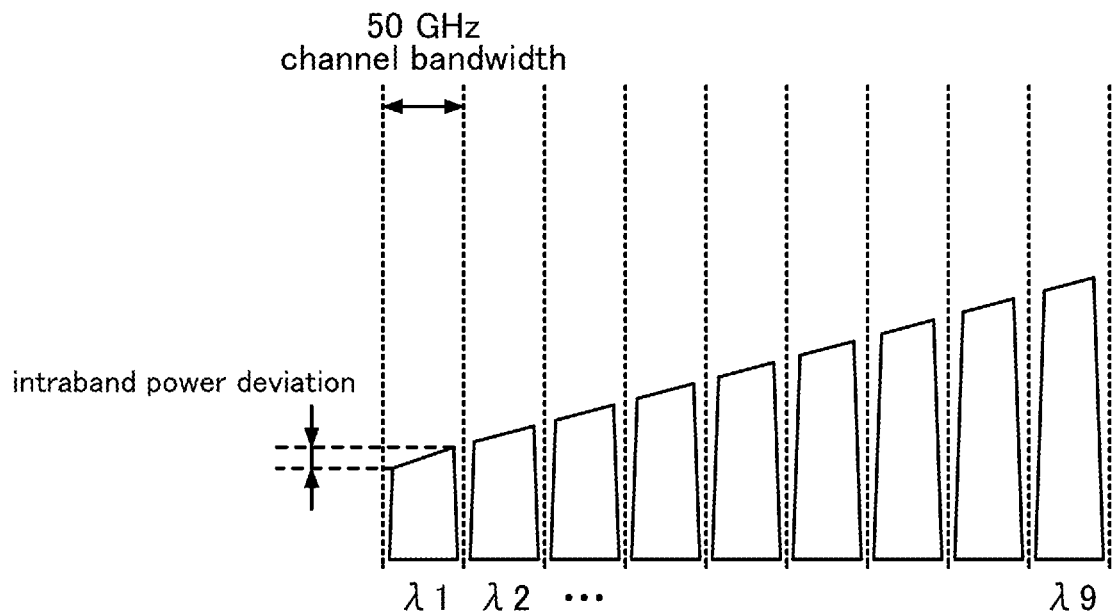
FIG. 3 illustrates spectra of WDM signals after transmission.
Figure 3:
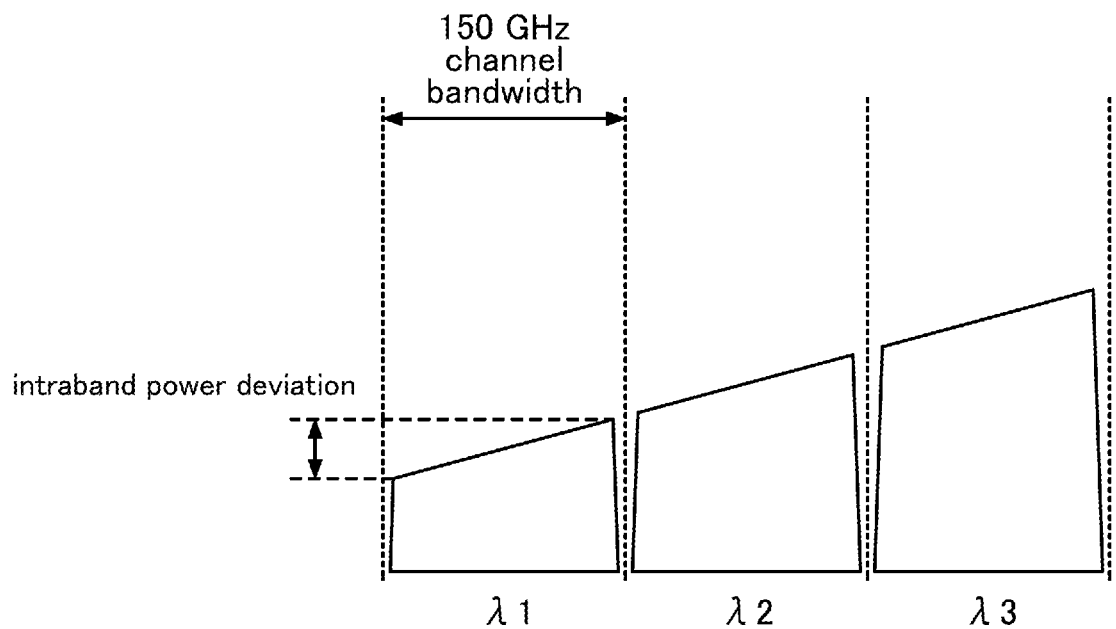

FIG. 3 illustrates a spectra of the WDM signal after transmission. FIG. 3 (A) illustrates a spectrum of a WDM signal of 50 GHz channel bandwidth after transmission, and FIG. 3 (B) illustrates a spectrum of a WDM signal of 150 GHz channel bandwidth after transmission. Due to the influence of wavelength-dependent loss or induced Raman scattering in the fiber-optic transmission line, or due to the frequency characteristics of amplifiers' gains, power deviation occurs between channels at both 50 GHz and 150 GHz. In addition, intra-band power deviation occurs in each channel. The intra-band power deviation may be expressed as the difference between the minimum power level and the maximum power level in the channel band, or the magnitude of power deviation from the reference value.

At 150 GHz, the intra-band power deviation is conspicuous because of the wider bandwidth. To reduce the intra-band power deviation, the optical power is controlled in unit interval of frequency narrower than the channel bandwidth according to the embodiment. In one example, the attenuation ability of the drop-side WSS 11 is used to control the optical power in a unit interval of frequency narrower than the channel bandwidth.

Figure 4:
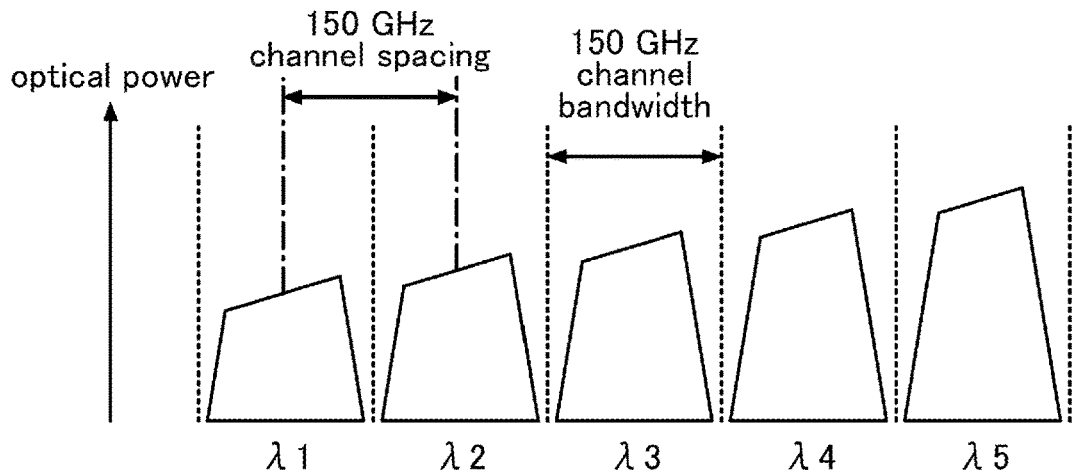
FIG. 4 illustrates an example of optical power control on a WDM signal after transmission.
Figure 4:
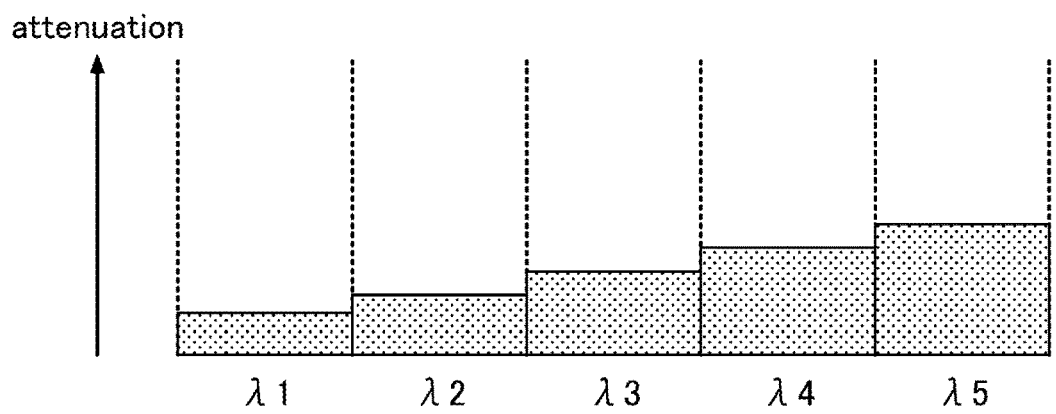
Figure 4:
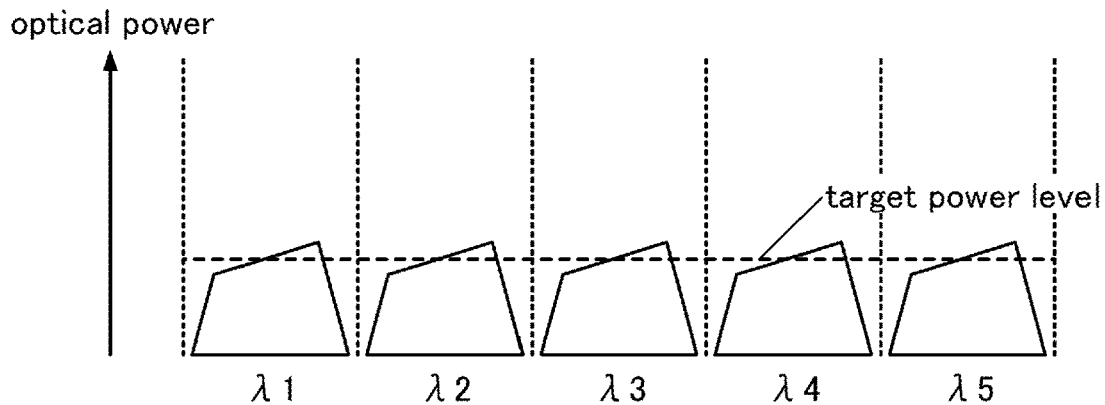

FIG. 4 illustrates, in power spectra, an example of optical power control which may be performed on the WDM signal after transmission. To facilitate the understanding of the optical power control of the embodiment, power control without dividing the channel bandwidth is first explained. In this case, the channel bandwidth and the unit interval of frequency of the power control are the same. FIG. 4 (A) shows a power spectrum of a WDM signal output from the preamplifier 101 of the fiber-optic communication apparatus 10-2. Due to the influence of the fiber-optic transmission line 6, inter-channel power deviation and intra-band power deviation occur in each channel. This power spectrum is input to the drop-side WSS 11.

FIG. 4 (B) illustrates attenuation levels set in the drop-side WSS 11. The attenuation levels are determined by the processor 15 based on the optical power monitoring result acquired by the optical monitor 13 for the respective channels. The amount of attenuation differs among the channels due to the degree of the wavelength-dependent loss of the fiber-optic transmission line 6 and/or the frequency characteristics of the amplifiers' gains. By applying the attenuation (B) to the power spectrum (A), the power spectrum of FIG. 4 (C) can be obtained. In the power spectrum (C), inter-channel power deviation is suppressed and spectra closer to the target power level can be obtained, but the intra-band power deviation still remains in each channel. This intra-band deviation becomes more pronounced as the channel bandwidth increases. Specific configurations and methods for reducing the intra-band power deviation 21) will be described in detail below.

Figure 5:
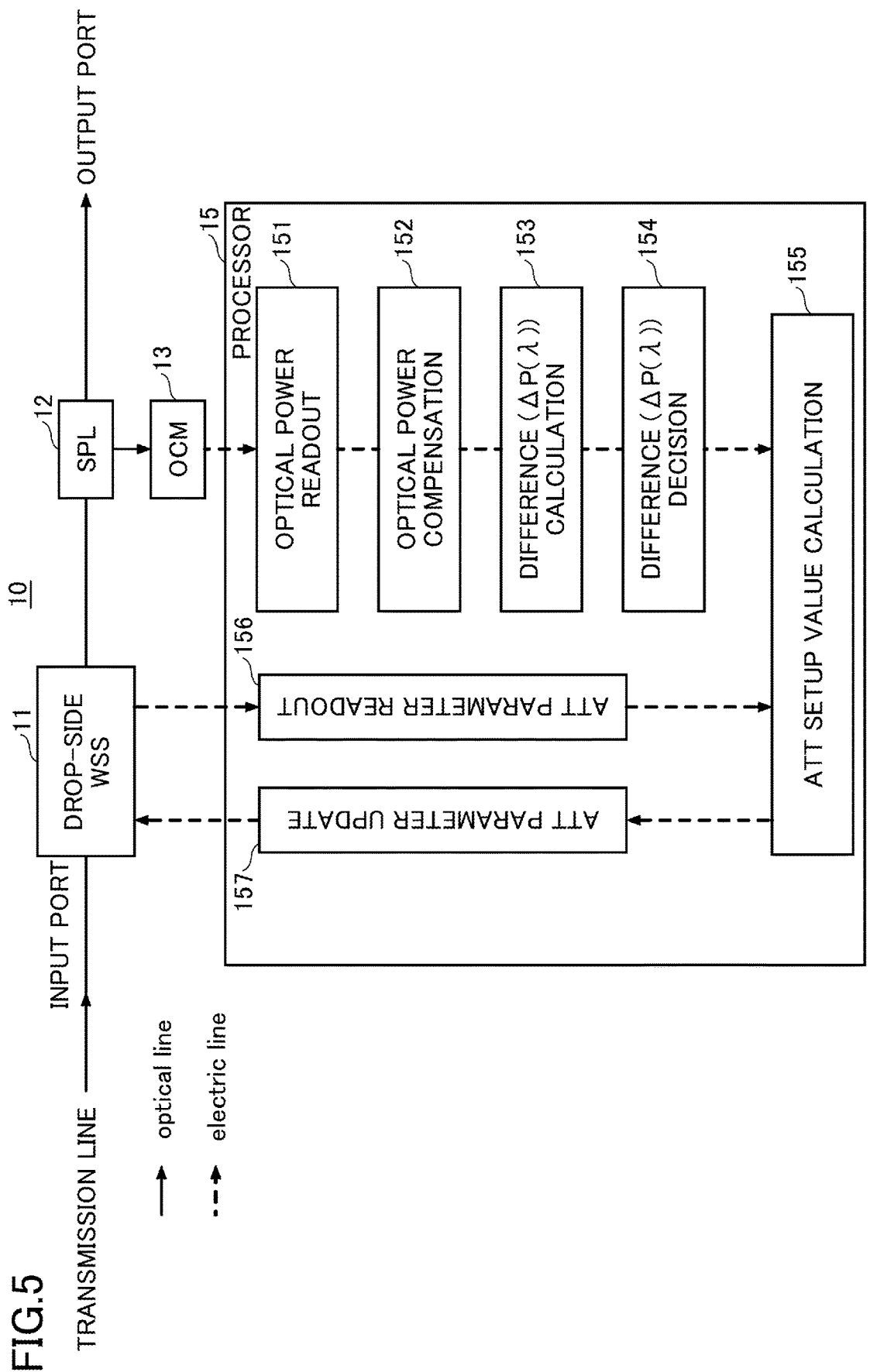
FIG. 5 is a functional block diagram of a processor used in a fiber-optic communication apparatus according to a first embodiment.

FIG. 5 is a functional block diagram of the processor 15 of the fiber-optic communication apparatus 10. The fiber-optic communication apparatus 10 may be either the fiber-optic communication apparatus 10-1 or 10-2 of FIG. 1. The processor 15 has an optical power readout part 151, an optical power compensation part 152, a difference calculation part 153, a difference decision part 154, an attenuation (denoted as "ATT" in the figure) setup value calculation part 155, an attenuation parameter readout part 156, and an attenuation update part 157, as the functional blocks. The "difference" of the difference calculation part 153 and the difference decision part 154 represents the difference between the target power level and the optical power level acquired in a unit interval of frequency (which is referred to as a "subchannel" for convenience), and is denoted as $\Delta P(\lambda)$.

The WDM signal having travelled through the fiber-optic transmission line is incident onto the input port of the drop-side WSS 11. The drop-side WSS 11 has an attenuation ability in a unit interval of frequency narrower than the channel bandwidth. For example, if the channel bandwidth is 150 GHz, attenuation can be performed in unit intervals of 50 GHz, 25 GHz, 12.5 GHz, 6.25 GHz, or the like, which are narrower than 150 GHz. Although the optical power is controlled in this example using the attenuation ability of the drop-side WSS 11, another device capable of controlling the power in a variable interval of frequency, such as a dynamic gain equalizer or a wavelength blocker, may be used.

A portion of the light output from the drop-side WSS 11 is split by the optical splitter 12 and guided to the optical monitor 13. Another portion of the light output from the drop-side WSS 11 is transmitted through to the output port. The optical monitor 13 detects the optical powers of the respective channels (or the wavelengths).

The optical power readout part 151 of the processor 15 reads the optical powers of the respective channels from the optical monitor 13. The power spectrum read by the optical power readout part 151 is not the same as the actual optical power spectrum of the WDM signal incident on the optical monitor 13. The optical power detected by the optical monitor 13 represents the average power level of each of the channels. The optical power compensation part 152 compensates for the readout power spectrum, and estimates or restores the original power spectrum incident onto the optical monitor 13. The details of the spectral correction (compensation) will be described later.

The difference calculation part 153 calculates the difference between the power level of the received WDM signal and the target power level for each subchannel, which is a unit region of control narrower than the channel bandwidth, based on the corrected power spectrum. The target power level is determined in advance based on the measurements of the fiber-optic transmission line 6 so that, for example, a flat wavelength or frequency characteristic is achieved between channels and within the channel band, as indicated by the dashed line in FIG. 4 (C).

The difference decision part 154 determines whether or not the difference $\Delta P(\lambda)$ calculated in the unit interval of frequency is within the acceptable range. The fact that the calculated difference is within the acceptable range means that the deviation from the target power level at that subchannel is allowable, and that the attenuation level currently set in the corresponding frequency region of the drop-side WSS 11 is appropriate.

If the difference is out of the acceptable range, the attenuation parameter readout part 156 reads the attenuation level of the currently controlled subchannel from the drop-side WSS 11 to update the attenuation level. The attenuation level readout from the drop-side WSS is supplied to the attenuation setup value calculation part 155. The attenuation setup value calculation part 155 calculates an attenuation setup value to be newly set in the drop-side WSS 11, based on the attenuation level of the currently controlled subchannel and the difference $\Delta P(\lambda)$ calculated by the difference calculation part 153. The calculated attenuation setup value is set in the corresponding subchannel of the drop-side WSS 11 by the attenuation update part 157. Thus, the attenuation level of the drop-side WSS 11 is updated to an appropriate value with the resolution finer than that of the channel bandwidth.

Figure 6:
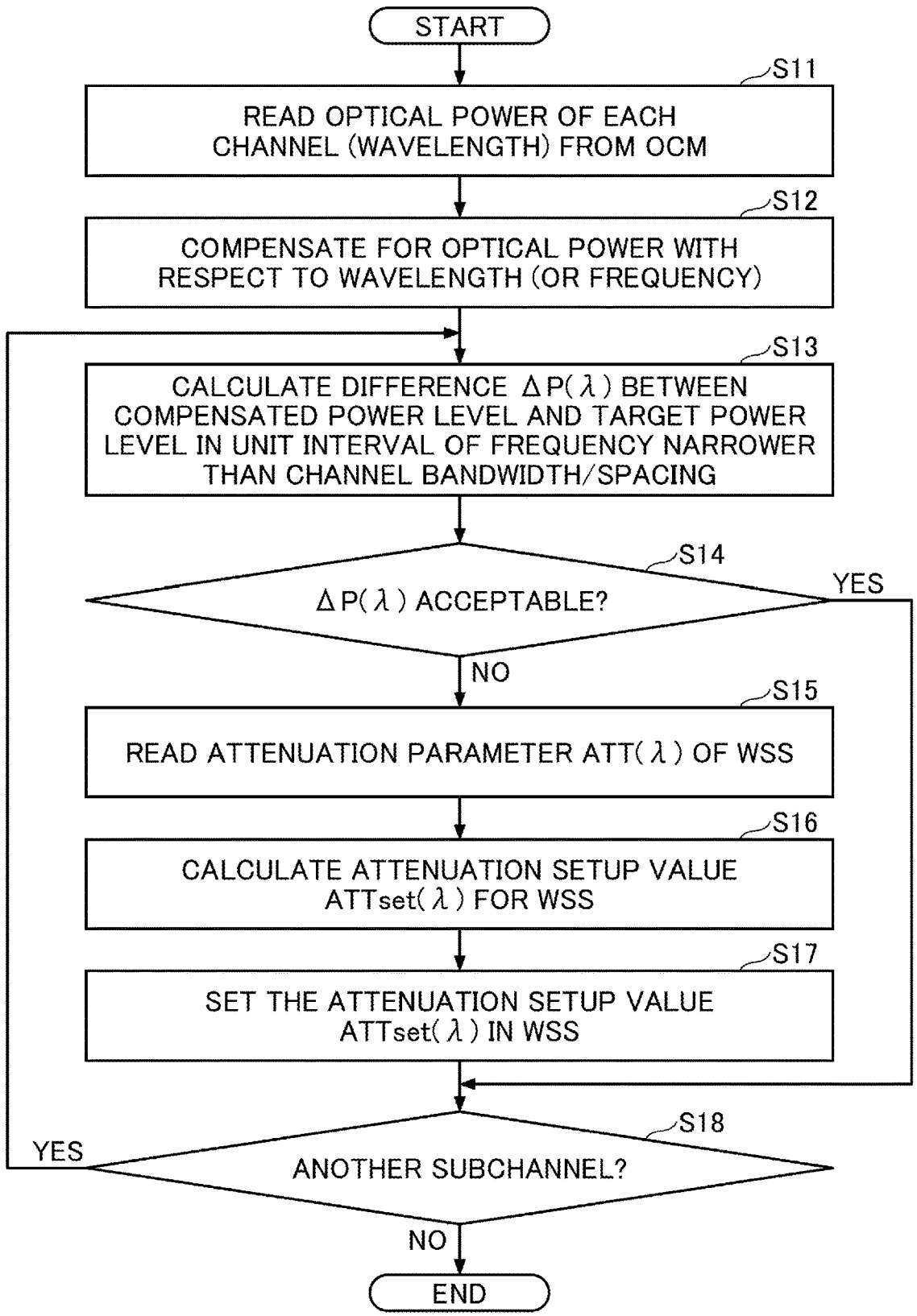
FIG. 6 is a flowchart of an optical power control method according to the first embodiment.
Figure 7:
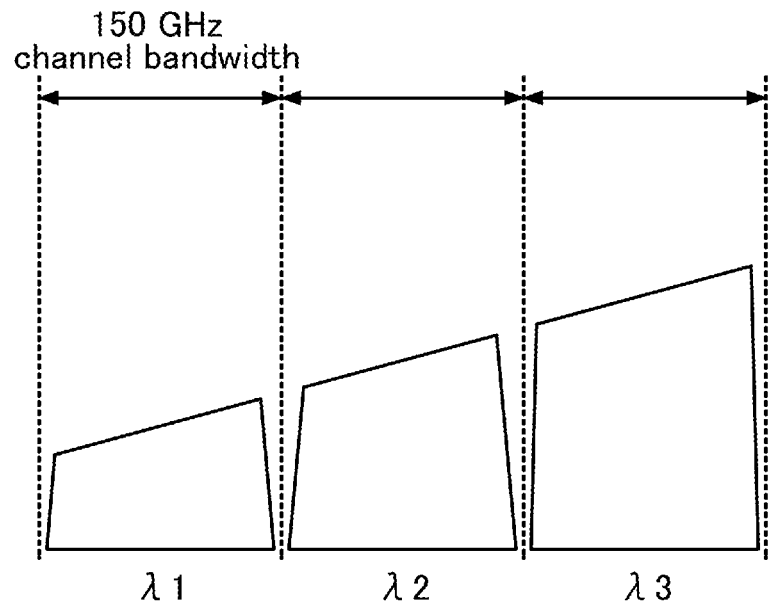
FIG. 7 illustrates a power spectrum input to an optical monitor and channel powers detected by the optical monitor.
Figure 7:
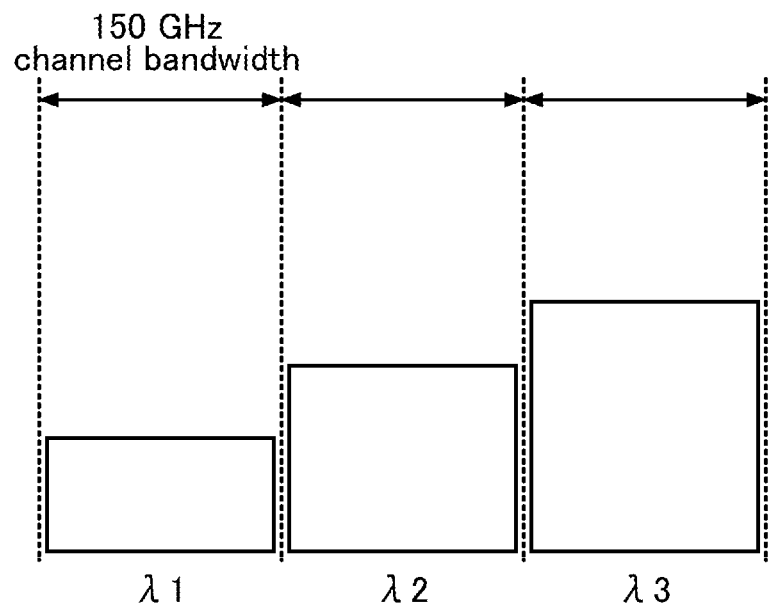

FIG. 6 is a flowchart of the optical power control method according to the first embodiment, which is executed by the processor 15. The processor 15 reads the optical powers of the respective channels from the optical monitor 13 (S11). FIG. 7 illustrates a power spectrum incident onto the optical monitor 13 and a power spectrum detected by the optical monitor 13. In this example, the WDM transmission channel bandwidth is 150 GHz. The power spectrum. (A) of FIG. 7, which is incident onto the optical monitor 13, has power deviation between channels, and simultaneously, has intra-band power deviation in each channel. In the power spectrum (B) of FIG. 7B, the inter-channel power deviation is detected by the optical monitor 13, but the intra-band power deviation of each channel cannot be detected. This is because the optical monitor 13 detects the optical power of each channel as the average power of that channel.

Figure 8:
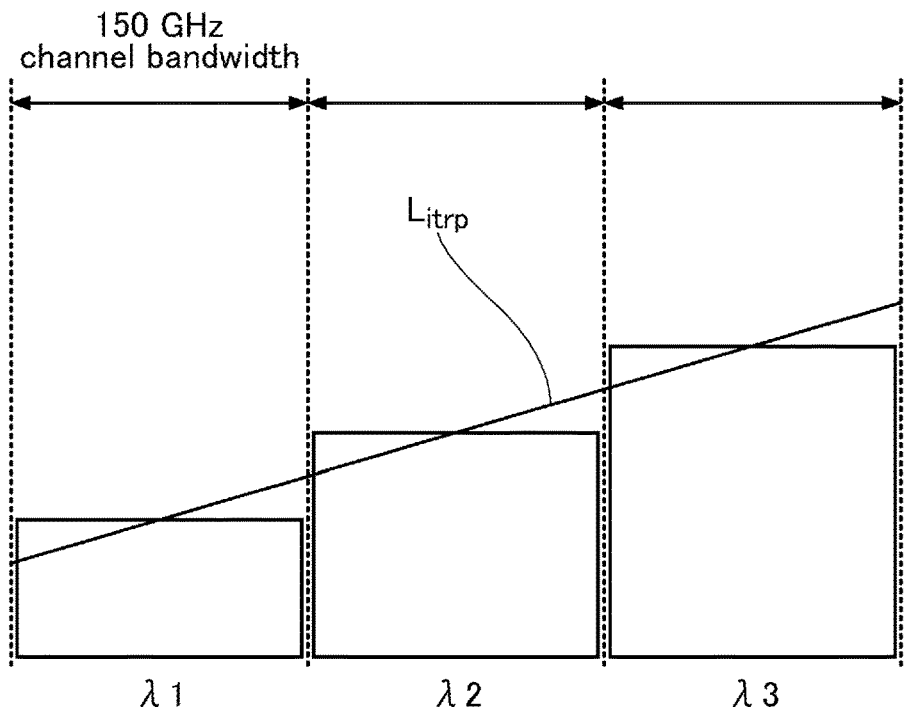
FIG. 8 illustrates compensation for the power spectrum detected by the optical monitor.

Returning to FIG. 6, the processor 15 corrects the power spectrum detected by the optical monitor 13 by compensating for the optical power with respect to the wavelength or frequency (S12). The optical power spectrum incident onto the optical monitor 13 is estimated or restored by this compensation. FIG. 8 illustrates an example of power spectrum compensation. In this example, the power spectrum acquired from the optical monitor 13 is corrected in the frequency direction by linear interpolation to estimate the optical power spectrum incident onto the optical monitor 13. The compensated power level is denoted as $L_{itrp}$. Linear interpolation may be expressed by Formula (1) using $P(\lambda 1)$ and $P(\lambda 3)$ which are the power levels of the wavelengths $\lambda 1$ and $\lambda 3$, respectively.

$$P(\lambda) = a\lambda + b \qquad (1)$$

$$\text{where } a = \frac{P(\lambda 3) - P(\lambda 1)}{\lambda 3 - \lambda 1}, \, b = P(\lambda 1) - \frac{P(\lambda 3) - P(\lambda 1)}{\lambda 3 - \lambda 1}\lambda 1$$

The compensation for the optical power spectrum detected by the optical monitor 13 is not limited to the linear interpolation described above, and the power spectrum may be compensated for by curve fitting or spline interpolation so as to fit the wavelength dependence of the optical power.

Figure 9:
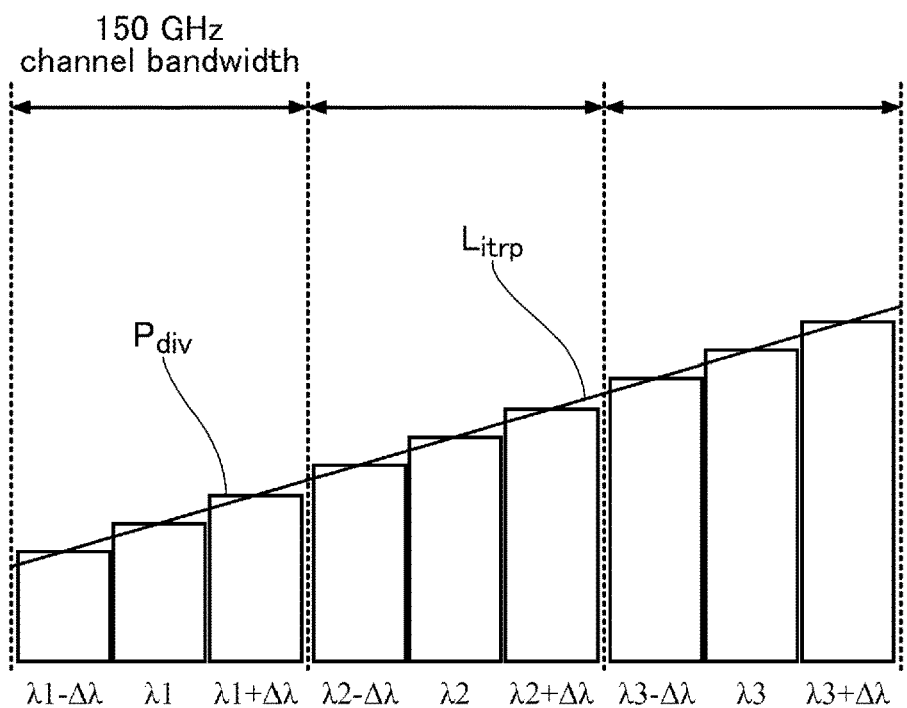
FIG. 9 illustrates an example of dividing the channel bandwidth into multiple subchannels in the frequency direction based on the compensated power spectrum.

Returning to FIG. 6, the processor 15 calculates the difference $\Delta P(\lambda)$ between the compensated power level and the target power level in a unit interval of frequency narrower than the channel bandwidth (S13). The target power level is one that flat within the channel band and flat between channels as has been described above. FIG. 9 illustrates an example of dividing the channel bandwidth in the frequency direction based on the compensated power spectrum. Dividing the channel bandwidth into unit intervals or subchannels may be performed before or simultaneously with the difference calculation by the difference calculation part 153.

In the example of FIG. 9, each channel of 150 GHz bandwidth is divided into three subchannels in the frequency direction, each having a bandwidth of 50 GHz, and the optical power $P_{div}$ is acquired for each of the subchannels. The center wavelengths of the three subchannels of channel $\lambda 1$ are expressed as $\lambda 1 - \Delta\lambda$, $\lambda 1$, and $\lambda 1 + \Delta\lambda$, respectively. The center wavelengths of the three subchannels of channel $\lambda 1$ are expressed as $\lambda 2 - \Delta\lambda$, $\Delta\lambda$, $\lambda 2$, and $\lambda 2 + \Delta\lambda$, respectively. The channel λ3 is also divided into three in the frequency (wavelength) direction, where AA corresponds to the subchannel spacing of 50 GHz and corresponds to the wavelength spacing of about 0.4 nm in the 1550 nm band.

Figure 10:
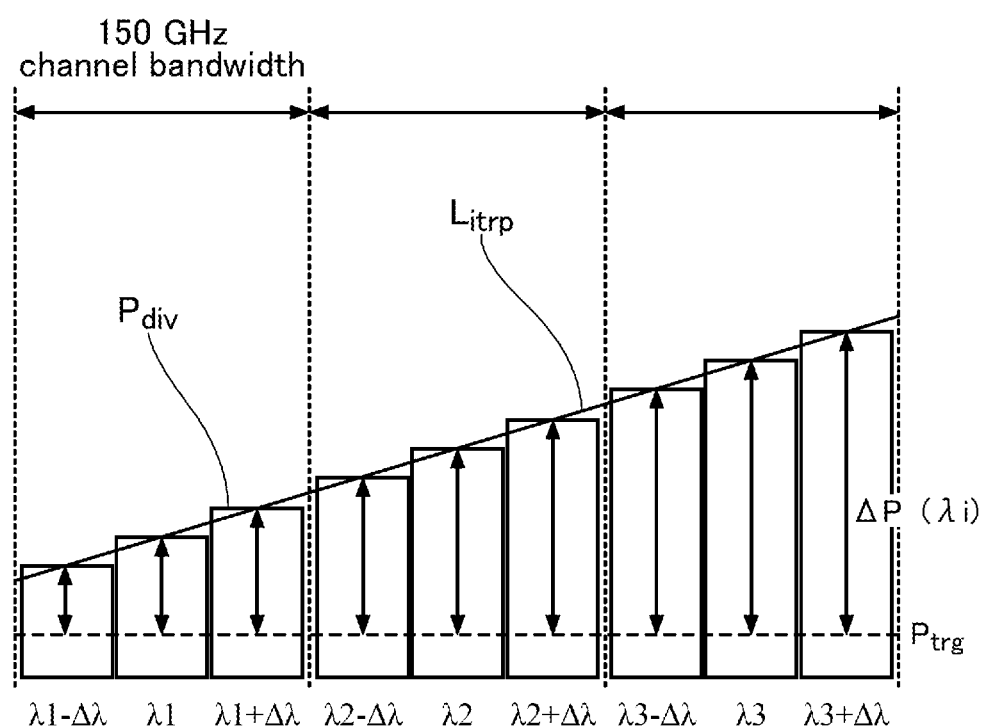
FIG. 10 illustrates calculation of a difference between the optical power and the target power level for each of the divided subchannels.

Because the difference ΔP(λ) between the compensated optical power and the target power level is calculated in unit intervals of frequency narrower than the channel bandwidth, the compensation for the Power spectrum shown in FIG. 8 is equivalent to power correction or compensation performed in unit intervals of frequency narrower than the channel bandwidth, FIG. 10 illustrates calculation of the difference between the optical power of each subchannel and the target power level $P_{trg}$. The target power level $P_{trg}$ may be predetermined based on the measurement of the fiber-optic transmission line. The optical power spectrum incident onto the optical monitor 13 is estimated from the detection result of the optical monitor 13, and accordingly, the optical power $P_{div}$ of each subchannel is acquired based on the compensated power spectrum. Thus, the difference $\Delta P(\lambda_i)$ between the optical power $P_{div}$ and the target power level $P_{trq}$ is calculated in unit intervals of frequency narrower than the channel bandwidth. The subscript "i" denotes subchannel index. If the number of channels in the WDM system is N, then "i" is an integer from 1 to 3×N in the example of FIG. 10.

For the purpose of simplification, the subchannel index i is omitted and then, the difference ΔP(λ) calculated in unit intervals of frequency narrower than the channel bandwidth is expressed by Formula. (2).

$$\Delta P(\lambda)=P(\lambda)-P(\lambda)\text{target}=a\lambda+b-P(\lambda)\text{target} \qquad (2)$$

Returning to FIG. 6, the processor 15 determines for each subchannel whether or not the difference ΔP(λ) of the subchannel is within the acceptable range (S14). If the difference ΔP(λ) is not within the acceptable range (NO in S14), the attenuation parameter currently set for that subchannel is not appropriate, and so the attenuation parameter needs to be updated. Specifically, the attenuation parameter ATT (λ) set for the currently processed subchannel in the drop-side WSS 11 is read into the processor 15 (S15), and an attenuation setup value ATTset(λ) is calculated (S16) to update the attenuation parameter of that subchnnel. The calculated attenuation setup value ATTset (80) is set in the corresponding subchannel of the drop-side WSS 11 (S17).

Upon updating the attenuation parameter of the currently controlled subchannel, the processor 15 determines if there is another subchannel left (S18). If there is an other subchannel (YES in S18), the process returns to step S13 and repeats steps Δp (λ)S13 to S17. If in step S14 the difference ΔP(λ) of the currently controlled subchannels is within the acceptable range (YES in S14), then the process skips to step S18 to check if an unprocessed subchannel remains, without updating the attenuation parameter of the current subchannel. If there is no other subchannel left (NO in S18), the process terminates. Instead of controlling the subchannels one by one, the subchannels may be controlled at once in Parallel. The control flow of FIG. 6 may be performed periodically or irregularly during the service.

Figure 11:
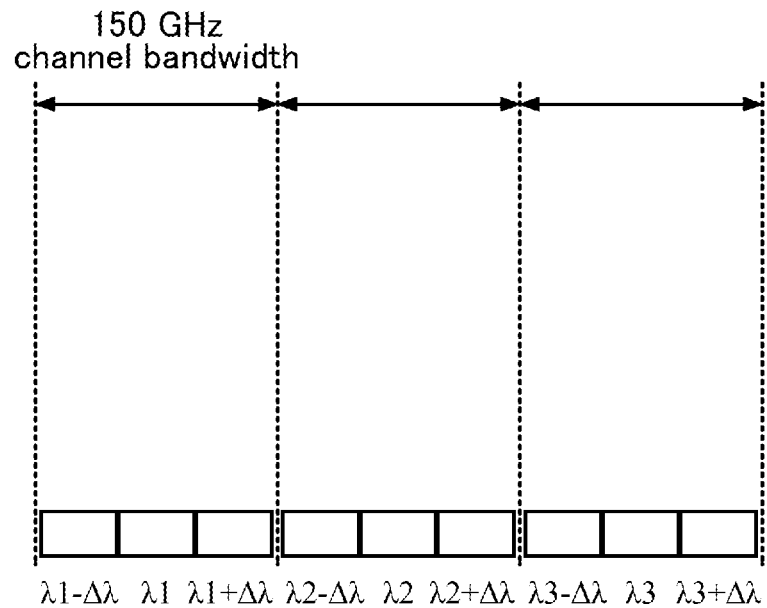
FIG. 11 illustrates updating of attenuation parameters.
Figure 11:
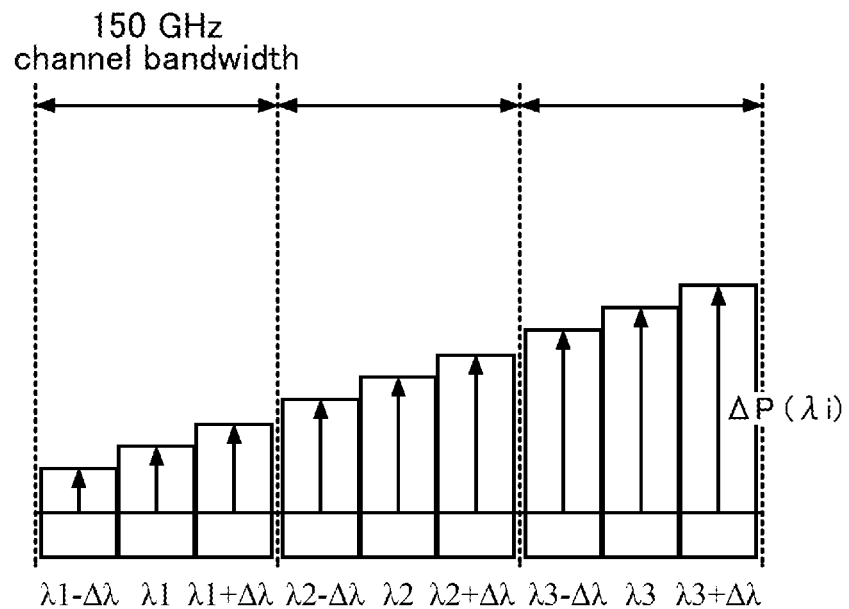

FIG. 11 illustrates updating of the attenuation parameters, in which shows attenuation parameters currently set in the WSS, and (B) shows the updated attenuation parameters. Although in the example of FIG. 11 (A) the same attenuation level is set or all the subchannels as the initial state, different attenuation levels may be set at first by measuring the state of the fiber-optic transmission line prior to starting the service of the fiber-optic communication apparatus 10.

In (B) of FIG. 11, the difference ΔP(λi) between the optical power of the corresponding subchannel and the target power level is added to the current attenuation level to set a new attenuation parameter.

Without the subscript "i" of the subchannel index, the updated attenuation setup value ATTset(λ) is expressed by Formula (3).

$$\text{ATTset}(\lambda)=\text{ATT}(\lambda)+\Delta P(\lambda) \qquad (3)$$

where ATT (λ) represents the current attenuation level of the subchannel to be controlled, and ΔP(λ) is the difference between the optical power of the subchannel and the target power level. In the above control flow, Formulas (1), (2), and (3) are described as functions of wavelength λ, but they may be represented as functions of frequency "f" based on the relationship c=λ*f where "c" denotes the speed of light.

Figure 12:
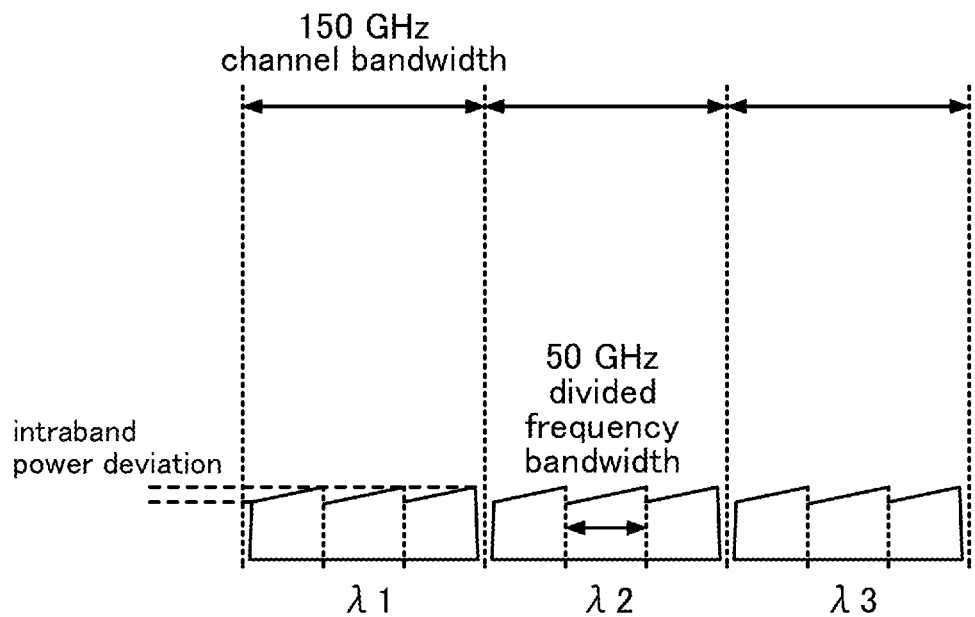
FIG. 12 illustrates examples of a power-controlled spectrum according to the first embodiment.
Figure 12:
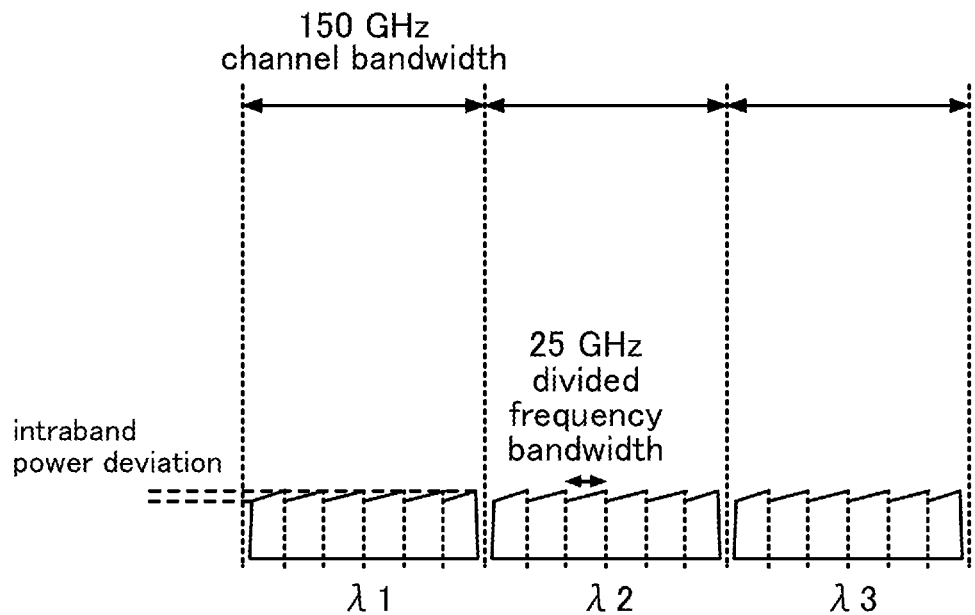

FIG. 12 illustrates examples of the spectrum after optical power control according to the first embodiment, in which shows the channel bandwidth of 150 GHz divided into three in the frequency direction and power controlled in unit intervals of frequency of 50 GHz, and (B) shows the channel bandwidth of 150 GHz divided into six in the frequency direction and power controlled in unit intervals of frequency of 250 GHz.

With reference to (A) of FIG. 12, the intra-band power deviation is significantly improved, compared with FIG. 3 (B) in which. 150 GHz channel bandwidth is not divided into the frequency direction. Furthermore, the intra-band power deviation is reduced, even compared with FIG. 3 in which the 50 GHz channel bandwidth is used without channel division in the frequency direction. Referring to (B) of FIG. 12, by setting the unit intervals of frequency for optical power control to 25 GHz, the intra-band power deviation is further reduced. Thus, both the inter-channel power deviation and intra-band power deviation are reduced in WDM transmission, and fiber-optic telecommunication with less deterioration in signal quality is achieved.

Second Embodiment

Figure 13:
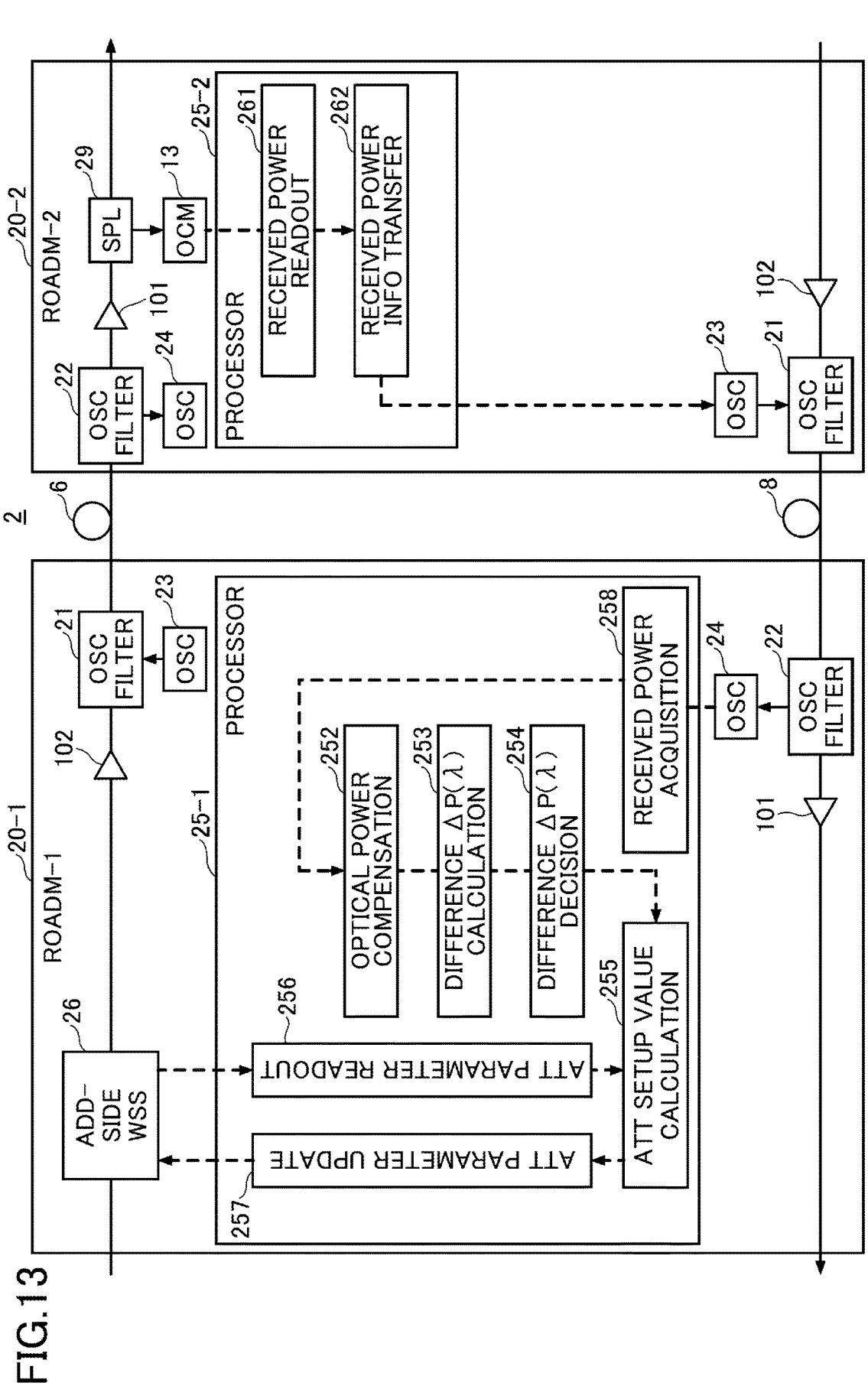
FIG. 13 is a schematic diagram of a fiber-optic communication system using a fiber-optic communication apparatus according to a second embodiment.

FIG. 13 is a schematic diagram of a fiber-optic communication system 2 using fiber-optic communication apparatuses 20-1 and 20-2 according to the second embodiment. In the second embodiment, the optical power is controlled at the transmitter side in unit intervals of frequency narrower than the channel bandwidth so that the wavelength characteristic of the output power of the receiver side preamplifier 101 becomes flat. ROADMs may be used as the fiber-optic communication apparatuses 20-1 and 20-2.

The fiber-optic communication apparatus 2 includes a first fiber-optic communication apparatus 20-1, a second fiber-optic communication apparatus 20-2, and a fiber-optic transmission line 6 connecting between the fiber-optic communication apparatuses 20-1 and 20-2. Inline amplifiers may be inserted in the fiber-optic transmission line 6. The fiber-optic communication apparatuses 20-1 and 20-2 are labelled as "ROADM-1" and "ROADM-2" as in the first embodiment. The solid arrows represent optical signal lines, and the dashed arrows represent electrical signal lines.

The fiber-optic communication apparatus 20-1 has an add-side WSS 26, a post-amplifier 102, an optical supervisory channel (OSC) processor 23, an OSC filter 21, and a processor 25-1, as the configuration of the transmitter section. The fiber-optic communication apparatus 20-2 has an OSC filter 22, an 050 processor 24, a preamplifier 101, an optical splitter 29, an optical monitor 13, and a processor 25-2, as the configuration of the receiver section.

For convenience of illustration, the receiver section of the fiber-optic communication apparatus 20-1 is illustrated as having only a part of the receiver section configuration of the fiber-optic communication apparatus 20-2, and the transmitter section of the fiber-optic communication apparatus 20-2 is illustrated as having only a part of the transmitter section configuration of the fiber-optic communication apparatus 20-1. However, in the actual configuration, the fiber-optic communication apparatuses 20-1 and 20-2 have the same structure. Accordingly, the receiver section of the fiber-optic communication apparatus 20-1 has the same configuration as the receiver section of the fiber-optic communication apparatus 20-2, and the transmitter section of the fiber-optic communication apparatus 20-2 has the same configuration as the transmitter section of the fiber-optic communication apparatus 20-1. Processors 25-1 and 25-2 may be shared between the transmitter section and the receiver section.

The WDM signal transmitted from the fiber-optic communication apparatus 20-1 to the fiber-optic transmission line 6 is received at the fiber-optic communication apparatus 20-2. A portion of the WDM signal having passed through the OSC filter 22 and amplified by the preamplifier 101 is split by the optical splitter 29, and the optical power of the respective channels are detected by the optical monitor 13. The power spectrum of light output from the preamplifier 101 contains intra-band power deviation, as well as interchannel power deviation, as illustrated in FIG. 7 (A) in contrast, the intra-band power deviation is lost in the optical power spectrum detected by the optical monitor 13 for the respective channels, as illustrated in FIG. 7 (B). The power information of the respective channels acquired by the optical monitor 13 is input to the processor 25-2.

The processor 25-2 has a received power readout part 261 and a received power transfer part 262 as its functional blocks. The received power readout part 261 reads the optical power of the respective channels detected by the optical monitor 13. The received power transfer part 262 transfers the optical power of the respective channels to the OSC processor 23 of the upstream-side transmitter section. The OSC processor 23 adds the transferred optical power information into the supervisory information. The supervisory information is converted into an USC signal and transmitted to the fiber-optic transmission line 8 via the OSC filter 21. Upon reception at the fiber-optic communication apparatus 20-1 from the fiber-optic transmission line 8, the OSC signal is extracted by the OSC filter 22, and converted into an electric signal and demodulated by the OSC processor 24. The demodulated OSC signal is input to the processor 25-1.

The processor 25-1 has an optical power compensation part 252, a difference calculation part 253, a difference decision part 254, an attenuation (denoted as "ATT" in the figure) setup value calculation pat 255, an attenuation parameter readout part 256, an attenuation parameter update part 257, and a received power acquisition part 258 as its functional blocks.

The received power acquisition part 258 acquires the power of the WDM signal received at the fiber-optic communication apparatus 20-2 from the input USC signal, specifically, as the optical power at the output stage of the preamplifier 101. The optical power compensation part 252 compensates for the power spectrum monitored at the fiber-optic communication apparatus 20-2 in the same manner as in the first embodiment, and estimates or restores the optical power spectrum incident onto the optical monitor 13.

The difference calculation part 253 calculates the difference between the power level of the WDM signal received at the fiber-optic communication apparatus 20-2 and the target power level in unit intervals of frequency (or subchannel) narrower than the channel bandwidth, based on the compensated power spectrum. The target power level may be predetermined so that the wavelength/frequency characteristic of the optical power becomes flat between channels and within the respective channels. The difference decision part 254 determines whether or not the difference calculated at the unit interval is within the acceptable range. The difference in optical power within the acceptable range means that the deviation from the target power level in the subchannel being controlled is within the acceptable range, and that the attenuation parameter currently set in the corresponding frequency region of the add-side WSS 26 is appropriate.

If the difference out of the acceptable range, then the attenuation readout part 256 reads the current attenuation level of the subchannel being no-trolled from the add-side WSS 26 to update the attenuation parameter. The readout attenuation parameter is supplied to the attenuation setup value calculation part 255, which calculates a new attenuation setup value based on the current attenuation parameter of the subchannel being controlled and the difference $\Delta P(\lambda)$ calculated by the difference calculation part 153. The calculated attenuation setup value is set in the corresponding subchannel of the add-side WSS 26 by the attenuation update part 257. Thus, the attenuation parameter of the add-side WSS 26 is updated to an appropriate level with a resolution finer than the channel bandwidth.

The WDM signal whose power spectrum has been shaped in advance by the add-side WSS 26 is transmitted from the fiber-optic communication apparatus 20-1 to the fiber-optic transmission line 6. The WDM signal received at the fiber-optic communication apparatus 20-2 and amplified by the preamplifier 101 has a flat wavelength characteristic within the channel band, and the power deviation between channels is also reduced. By flattening the wavelength characteristic of the optical power spectrum output from the preamplifier 101, the end-to-end OSNR is improved. Further, the demodulation error is reduced in the optical signal dropped at the fiber-optic communication apparatus 20-2.

Figure 14:
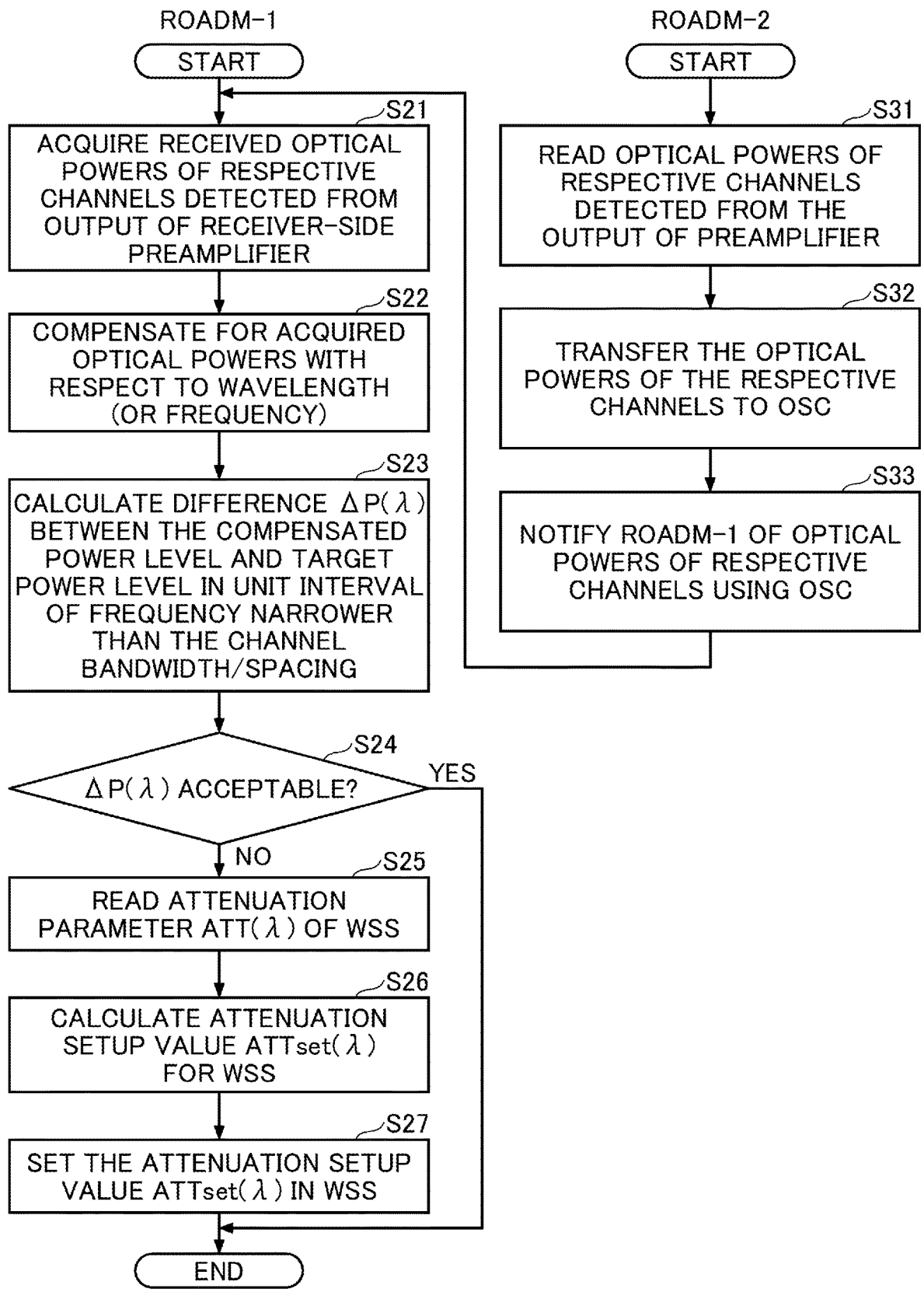
FIG. 14 is a flowchart of an optical power control method according to the second embodiment.

FIG. 14 is a flowchart of the optical power control method according to the second embodiment. The control flow from S21 to S28 under "ROADM-1" is executed by the processor 25-1 of the fiber-optic communication apparatus 20-1. The control flow of S31, S32, and S33 under "ROADM-2" is executed by the fiber-optic communication apparatus 20-2.

The processor 25-2 of the fiber-optic communication apparatus 20-2 reads the optical power spectrum of the received WDM signal, which is output from the preamplifier 101 and detected by the optical monitor 13 (631), and transfers the readout optical power of the respective channels to the 066 processor (632). The fiber-optic communication apparatus 20-2 transmits the optical power information of the respective channels to the upstream fiber-optic communication apparatus 20-1, using 066 (633).

The processor 25-1 of the fiber-optic communication apparatus 20-1 acquires the optical power information of the receiver-side WDM signal by the OSO (621). This receiver-side optical power information represents the optical powers of the respective channels output from the preamplifier 101 and detected by the optical monitor 13 of the fiber-optic communication apparatus 20-2. The processor 25-1 compensates for the optical power information with respect to the wavelength (frequency) (S22). The optical power may be compensated for by linear interpolation described in the first embodiment, or curve fitting or spline interpolation. Based on the compensated optical power spectrum, the processor 25-1 calculates the difference $\Delta P(\lambda)$ from the target power level in unit intervals of frequency narrower than the channel bandwidth or the channel spacing (S23). The target power level is one that levels the wavelength characteristics of the optical power within the respective channels and suppresses the deviation between channels.

The processor 25-1 determines whether or not the difference $\Delta P(\lambda)$ is within the acceptable range for each unit interval of frequency (or subchannel) narrower than the channel bandwidth (S24). If the difference $\Delta P(\lambda)$ is out of the acceptable range (NO in S24), the attenuation parameter currently set for the frequency region corresponding to the controlled subchannel is not appropriate, so the attenuation parameter is updated. Specifically, the processor 25-1 reads the attenuation parameter ATT ($\lambda$) of the subchannel being controlled from the add-side WSS 26 (S25), determines an attenuation setup value ATTset($\lambda$) for that subchannel (326), and sets a new attenuation parameter (S27).

Upon updating the attenuation parameter of the current sub channel, the processor 25-1 performs the same control on the other subchannels. When the optical powers of all the subchannels have been controlled, the current round of the control process to Instead of controlling the subchannels one by one, the subchannels may be controlled in parallel at once. The control flow of FIG. 14 may be performed periodically or irregularly during the service.

Third Embodiment

Figure 15:
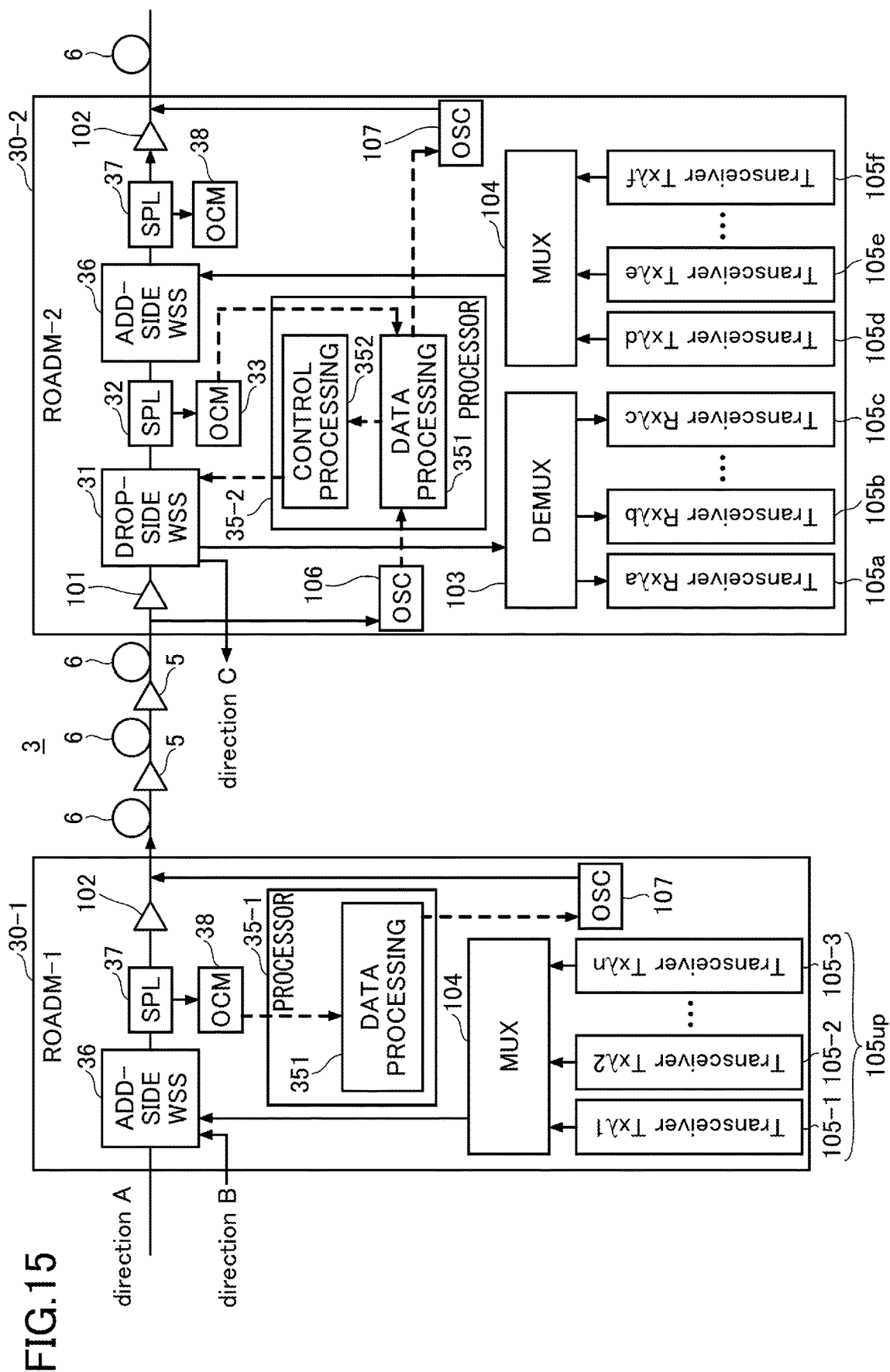
FIG. 15 is a schematic diagram of a fiber-optic communication system using a fiber-optic communication apparatus according to a third embodiment.

FIG. 15 is a schematic diagram of a fiber-optic communication system 3 including fiber-optic communication apparatuses 30-1 and 30-2 according to the third embodiment. ROADM devices may be used as the fiber-optic communication apparatuses 30-1 and 30-2. In the third embodiment, the optical power is controlled using an upstream signal spectrum, which has not yet been affected by the fiber-optic transmission line 6 or amplifiers, and a downstream optical power spectrum, which is received from the fiber-optic transmission line 6 at the downstream fiber-optic apparatus. Similar to the first and the second embodiments, the optical power of the receiver-side WDM signal is controlled in unit intervals of frequency narrower than the channel bandwidth.

Both the power spectrum of the upstream WDM signal that has not yet been affected by the fiber-optic transmission line 6 and the power spectrum of the downstream WDM signal received via the fiber-optic transmission line 6 are detected at a resolution sufficiently higher than the WSS attenuation resolution, namely, in frequency intervals sufficiently narrower than the WSS attenuation intervals. The WDM signal that has not yet been affected by the fiber-optic transmission line 6 is, for example, a WDM signal that has been added in the fiber-optic communication apparatus 30-1 and has not yet passed through the fiber-optic transmission line 6. The resolution of WSS attenuation is 50 GHz, 25 GHz, 12.5 GHz, 6.25 GHz, and so on, and the power spectrum detected with much higher resolution. The upstream power spectrum detected with high resolution is integrated in the frequency direction so as to match the WSS control interval, and is sent to the downstream fiber-optic communication apparatus by the OSC. Similarly, the downstream power spectrum detected with high resolution is integrated in the frequency direction so as to match the WSS control interval. Based on the integrated upstream signal spectrum and the integrated downstream power spectrum, the optical power is controlled in a unit interval of frequency narrower than the channel bandwidth.

The fiber-optic communication apparatuses 30-1 and 30-2 are connected by a fiber-optic transmission line 6. Relay amplifiers 5 may be inserted in the fiber-optic transmission line 6. The fiber-optic communication apparatus 30-1 on the upstream side has a processor 35-1, an add-side WSS 36, an optical splitter 37, an optical monitor 38, a multiplexer 104, a post-amplifier 102, and an ISO processor 107.

Transceivers 105-1, 105-2, and 105-3 (collectively referred to as "transceiver 105up") which handle signals of different wavelengths, are connected to the fiber-optic communication apparatus 30-1. In FIG. 15, the transmitter circuits Tx of the transceivers 105-1, 105-2, and 105-3 are illustrated as the transmitter side configuration of the fiber optic communication apparatus 30-1. The optical signals output from the transceivers 105up are multiplexed at the multiplexer 104. The multiplexed optical signals are incident to the add-side WSS 16 and multiplexed with the other optical signals coming from directions A and B.

A portion of the output of the add-side WSS 36 is split by the optical splitter 37 and fed to the optical monitor 38. The optical monitor 38 detects the power spectrum of the incident WSS signal, which includes those channels that have not yet been affected by the frequency characteristics of the fiber-optic transmission line 6 and/or the amplifiers gain characteristics, at a frequency interval sufficiently narrower than the attenuation interval of the add-side WSS 36. The signals coming from directions A and B have already been affected by the fiber-optic transmission line 6 and/or the amplifiers, but the WDM signals output from the transceivers 105up and multiplexed at the multiplexer 104 are unaffected signals free from the influence of the fiber-optic transmission line 6 and/or the amplifiers.

If the attenuation resolution of the add-side WSS36 is 25 GHz, the optical monitor 38 detects the optical powers of the unaffected channels multiplexed at the multiplexer 104 with high resolution at a frequency interval much finer than 25 GHz. By detecting the optical power with a resolution higher than the attenuation resolution, the same effect as compensation for the power spectrum detected by the optical monitor 38 can be achieved. The detected power spectrum is input to the processor 35-1.

The data processing part 351 of the processor 35-1 integrates the power spectrum detected by the optical monitor 38 in the frequency direction so as to match the control interval of the WSS (for example, the attenuation interval). The signal spectrum integrated in the frequency direction is converted into an optical signal by the OSC processor 107 and transmitted to the fiber-optic transmission line 6.

The fiber-optic communication apparatus 30-2 includes a drop-side WSS 31, an optical splitter 32, an optical monitor 33, a processor 35-2, and an OSC processor 106. The fiber-optic communication apparatus 30-2 also has an add-side WSS 36, an optical splitter 37, an optical monitor 38, a multiplexer 104, a post-amplifier 102, and an OSC processor 107, as the transmitter section configuration. The above-described configurations and functions are the same as those of the transmitter section of the fiber-optic communication apparatus 30-1. The data processing part 351 of the processor 35-2 may also have the function of the data processing unit 351 of the processor 35-1 provided in the transmitter section of the fiber-optic communication apparatus 30-1.

The OSC signal received at the fiber-optic communication apparatus 30-2 is converted into an electric signal by the OSC processor 106 and input to the data processing part 351 of the processor 35-2. The WDM signal received at the fiber-optic communication apparatus 30-2 is amplified by the preamplifier 101 and incident onto the drop-side WSS 31. At the drop-side WSS 31, a portion of the WDM signal is fed to direction C, and another portion of the WDM signal is demultiplexed by the demultiplexer 103 and distributed to the receivers of the transceivers 105a, 105b, and 105c. The remaining portion of the WDM signal is incident onto the optical splitter 32.

The optical splitter 32 splits the incident WDM signal, and guides the split portions of the WDM signal to the optical monitor 33 and the add-side WSS 36, respectively. The optical monitor 33 detects the power spectrum of the incident optical signal at frequency intervals much finer than the attenuation interval of the drop-side WSS 31. The detection result is input to the data processing part 351 of the processor 35-2. The data processing part 351 integrates the high-resolution power spectrum acquired from the optical monitor 33 in the frequency direction so as to match the attenuation interval of the drop-side WSS 31. Consequently, the frequency interval of the upstream signal spectrum acquired from the OSC processor 106 and the frequency interval of the power spectrum detected by the optical monitor 33 match each other.

The data processing part 351 compares the power spectrum of the unaffected signal, which was sent from the fiber-optic communication apparatus 30-1 using OSC, with the power spectrum of the received signal detected at the fiber-optic communication apparatus 30-2. The comparison result is supplied as a control amount of the drop-side WSJ 31 to the control processing part 352. The control processing part 352 controls the attenuation parameter of the drop-side WSS 31 according to the control amount. The control amount or attenuation setup value is determined so that the received signal power spectrum approaches the upstream signal power spectrum. Also, the control amount or the attenuation setup value is determined so that the power deviation between channels is minimized in the received signal power spectrum.

The optical power of each channel (or wavelength λi) at the upstream fiber-optic communication apparatus 30-1 is Pλi, the optical power of each wavelength λi) monitored by the downstream fiber-optic communication apparatus 30-2 is P'λi, and the subchannel index acquired by dividing the channel bandwidth is j. The attenuation setup values Ajλi of the respective subchannels in each of the wavelengths (channels) may be expressed as follows.

A1 λ1=P'1 λ1−P1 λ1
A2 λ1=P'2 λ1−P2 λ1
. . .
A1 λ2=P'1 λ2−P1 λ2
A2 λ2=P'2 λ2−P2 λ2
. . .
A1 λ3=P'1 λ3−P1 λ3
A2 λ3=P'2 λ3−P2 λ3.

The power spectrum of the unaffected WDM signal, which has been added in the fiber-optic communication apparatus 30-1 and has not yet passed through the fiber-optic transmission line 6 without being influenced by the fiber-optic transmission line 6 and/or the amplifiers, is used as the reference for the optical power control. The optical power is controlled in unit intervals of frequency narrower than the channel bandwidth so as to compensate for the fluence of the fiber-optic transmission line 6 based on the unaffected power spectrum. As a result, more accurate power control is achieved, and inter-channel power deviation and intra-band power deviation are both sufficiently reduced.

Figure 16:
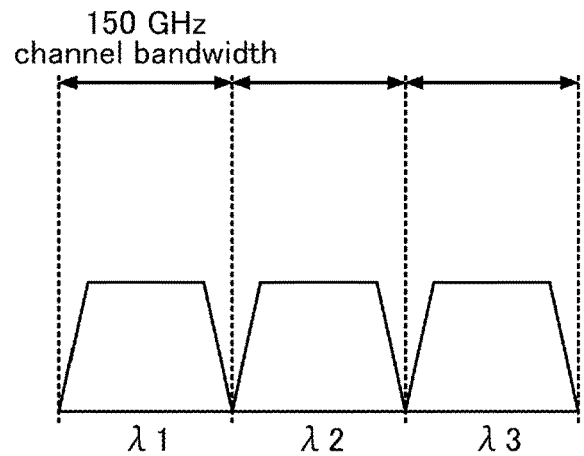
FIG. 16 illustrates power spectrum processing performed at the upstream fiber-optic communication apparatus of FIG. 15.
Figure 16:
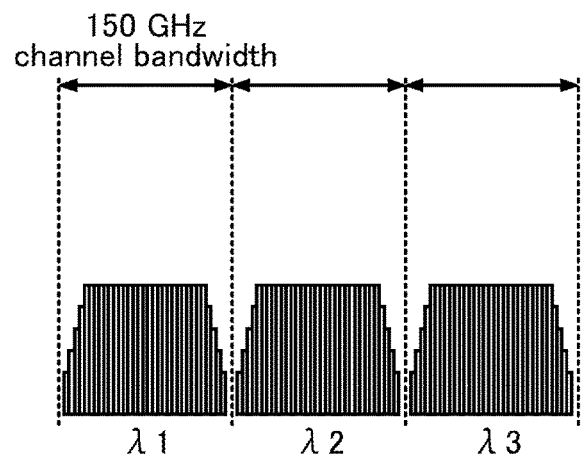
Figure 16:
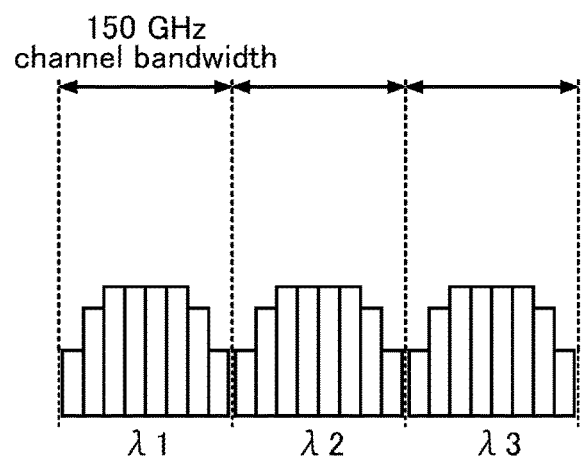

FIG. 16 illustrates processing of the power spectrum at the fiber-optic communication apparatus 30-1. FIG. 16 (A) shows a power spectrum of the optical signal incident onto the optical monitor 38, which has not yet been affected by the fiber-optic transmission line 6. In other words, the power spectrum of the optical signal multiplexed by the multiplexer 104 and to be added to the add-side WSS 36 is illustrated.

FIG. 16 (B) shows the optical powers of the respective channels detected by the optical monitor 38. The optical monitor 38 detects the optical powers at a frequency interval sufficiently finer than the attenuation control interval of the add-side WSS 36. It is noted that the power detected at the fine resolution is the average power of each of the frequency intervals. In this state, the detected powers do not match the WSS control interval.

FIG. 16 (C) shows a power spectrum integrated in the frequency direction by the data processing part 351. The integration in the frequency direction is a process of bringing the upstream power spectrum information to match the optical power control interval, for instance, the attenuation control interval of the drop-side WSS 31 of the downstream fiber-optic communication apparatus 30-2. The signal spectrum of FIG. 16 (C) is sent to the fiber-optic communication apparatus 30-2 using the OSC.

Figure 17:
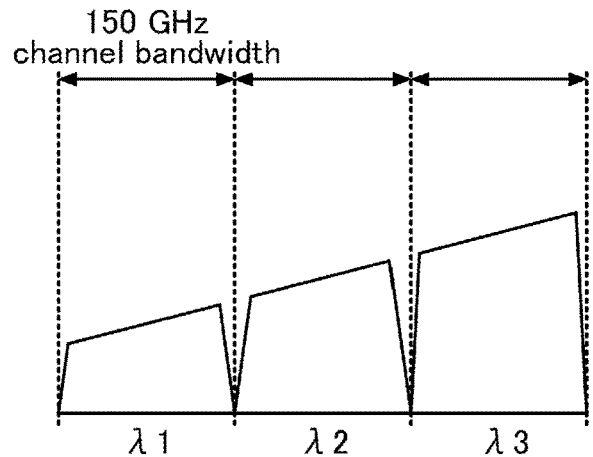
FIG. 17 illustrates power spectrum processing performed at the downstream fiber-optic communication apparatus of FIG. 15.
Figure 17:
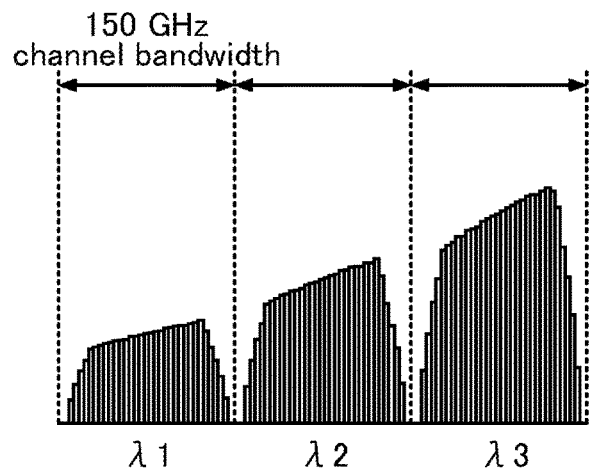
Figure 17:
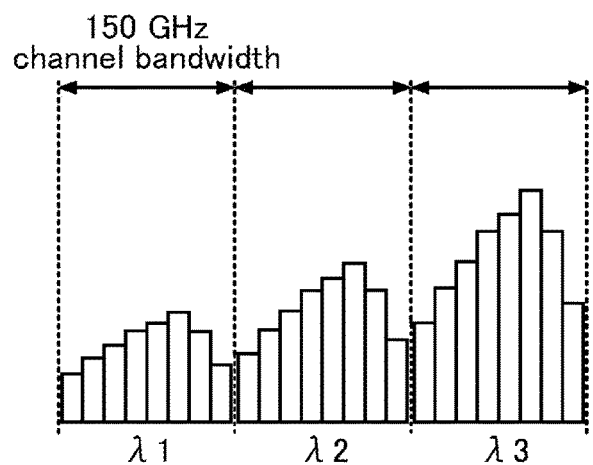

FIG. 17 illustrates processing of the power spectrum at the fiber-optic communication apparatus 30-2. FIG. 17 shows a power spectrum of the WDM signal incident onto the optical monitor 33. Due to the influence of the wavelength-dependent loss on the fiber-optic transmission line 6, induced Raman scattering, the wavelength characteristics of the amplifiers' gains, etc., inter-channel power deviation and intra-band power deviation have occurred.

FIG. 17 (B) shows optical powers of the respective channels detected by the optical monitor 33. The optical monitor 33 detects the optical powers of the incident WDM signal at a frequency interval sufficiently finer than the attenuation control interval of the drop-side WSS 31. Again, the average power of each of the frequency intervals is detected by the optical monitor 33. In this state, the interval of the power detection does not match the control interval of the drop-side WSS 31.

FIG. 17 (C) shows a power spectrum integrated in the frequency direction by the data processing part 351. The integration in the frequency direction is a process of bringing the detection result of the optical monitor 33 to match the attenuation control interval of the drop-side WSS 31.

Figure 18:
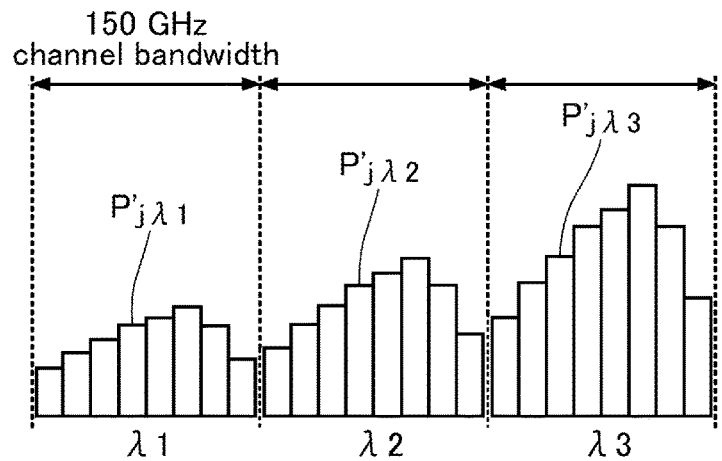
FIG. 18 illustrates optical power control performed at the downstream fiber-optic communication apparatus of FIG. 15.
Figure 18:
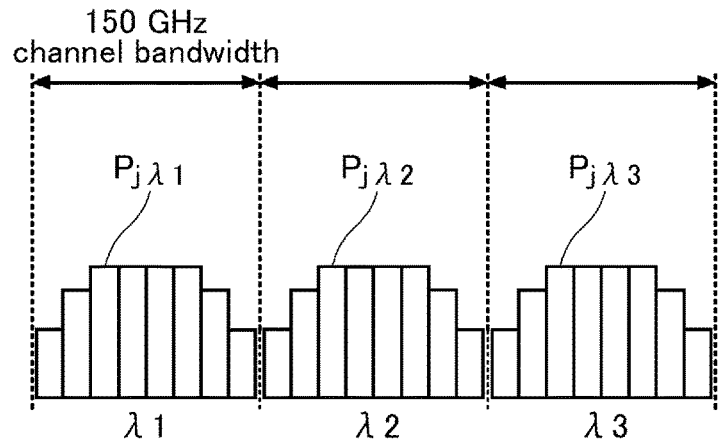
Figure 18:
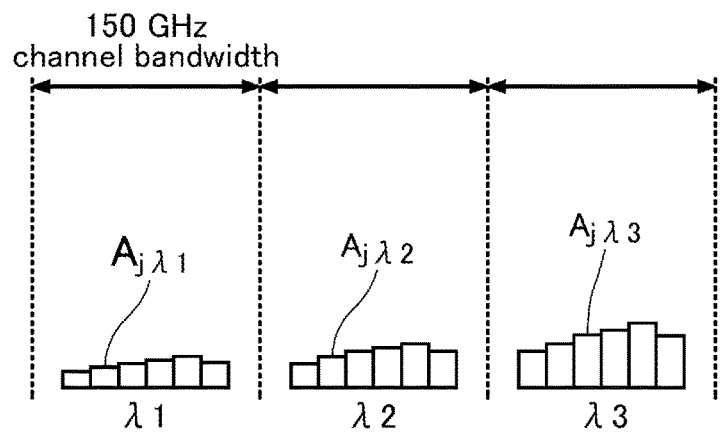

FIG. 18 illustrates optical power control performed at the fiber-optic communication apparatus 30-2. FIG. 18 (IQ shows a power spectrum integrated in the frequency direction at the downstream side, that is, at the fiber-optic communication apparatus 30-2. This power spectrum corresponds to the power spectrum (C) of FIG. 17. Each channel is divided into, for example, eight frequency bands j, where j is an integer from 1 to 8, in accordance with the attenuation control interval of the drop-side WSS 31. In this example, the attenuation control interval of the drop-side WSS 31 is 18.76 GHz. The integrated power of the j-th frequency band of each channel is represented by P'jλn, where n is a channel number.

FIG. 18 (B) shows a signal spectrum sent from the upstream fiber-optic communication apparatus 30-1. This signal spectrum corresponds to the power spectrum (C) of FIG. 16. In this signal spectrum, each channel is divided into eight frequency bands j. The integrated power of the j-th frequency band of each channel is represented by Pjλn.

FIG. 18 (C) shows a comparison result (e.g., a difference, a power ratio, etc.) between (A) and (B) of FIG. 18. The comparison result is a control value (for example, an attenuation setup value) for the drop-side WSS 31. The control value is represented by Ajλn. If the difference is used as the comparison result, the control value calculated by $$Aj\lambda n = P'j\lambda n - P'j\lambda n.$$

If the power ratio is used as the comparison result, the control value is calculated by $$Aj\lambda n = P'j\lambda n / P'j\lambda n.$$

In place of the difference or the power ratio, an appropriate function may be used for calculating the control value.

With this configuration and method, the optical power is controlled at a control interval narrower than the channel bandwidth, and both the inter-channel power deviation and intra-band power deviation can be reduced.

Fourth Embodiment

Figure 19:
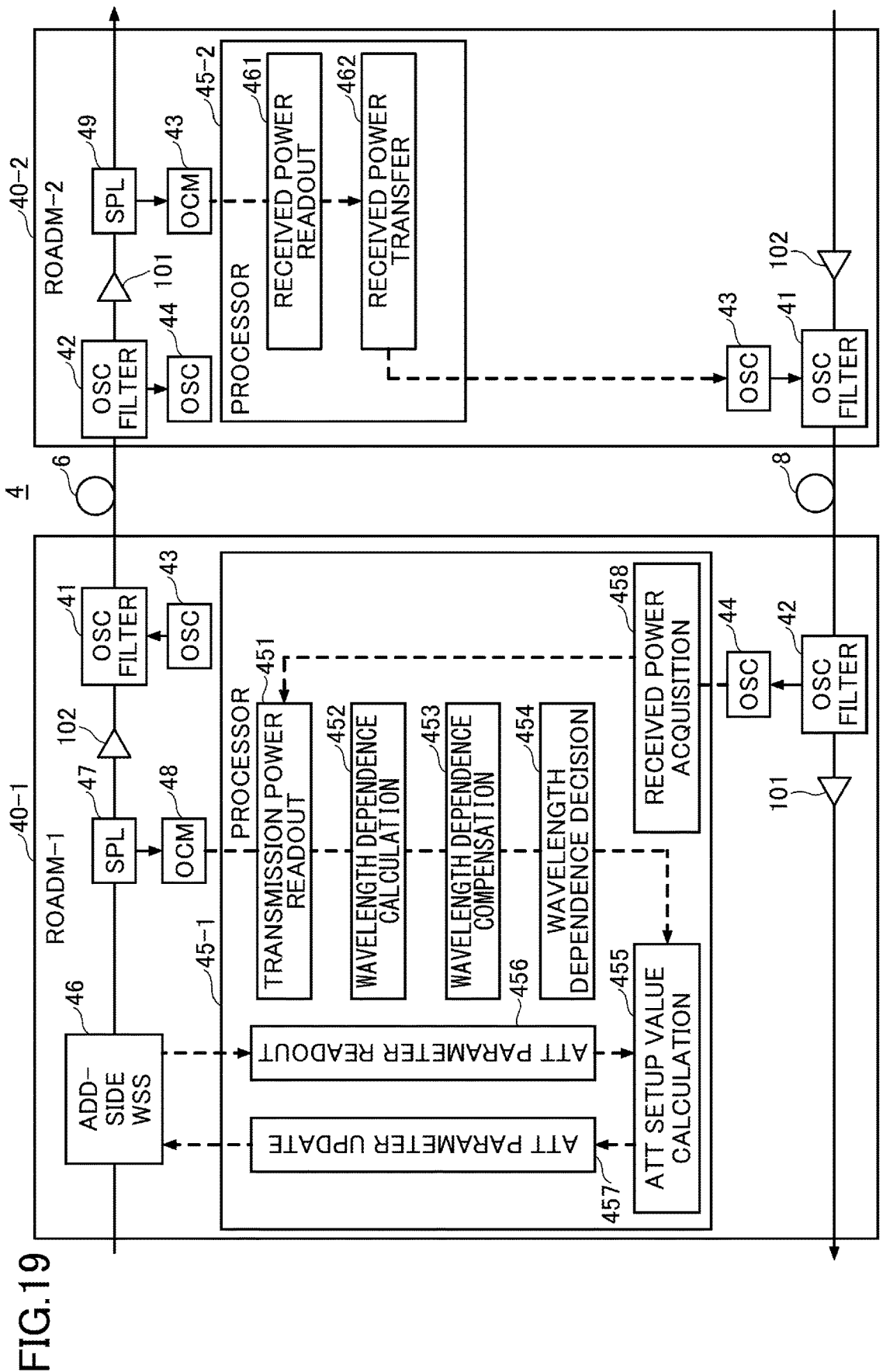
FIG. 19 is a schematic diagram of a fiber-optic communication system using a fiber-optic communication apparatus according to a fourth embodiment.

FIG. 19 is a schematic diagram of a fiber-optic communication system 4 including fiber-optic communication apparatuses 40-1 and 40-2 according to the fourth embodiment. In the fourth embodiment, the optical power spectrum monitored at the receiver side is fed back to the transmitter side fiber-optic communication apparatus, and the optical power is controlled at the transmitter side in unit intervals of frequency narrower than the channel bandwidth so as to reduce the intra-band power deviation occurring at the receiver side. The fiber-optic communication apparatus of the transmitter side determines the wavelength dependence at each of the unit intervals of frequency, and controls the optical power based on the intra-band power deviation of the receiver side.

The optical communication system 4 includes fiber-optic communication apparatuses 40-1 and 40-2, and fiber-optic transmission lines 6 and 8 connecting the first and second fiber-optic communication apparatuses 40-1 and 40-2. Inline amplifiers may be inserted in the fiber-optic transmission lines 6 and 8. The fiber-optic communication apparatuses 40-1 and 40-2 are, for example, ROADM devices. Similar to FIG. 1, FIG. 13, and FIG. 15, solid arrows represent optical signal lines and dashed arrows represent electrical signal lines.

The fiber-optic communication apparatus 40-1 has an add-side WSS 46, an optical splitter 47, an optical monitor 48, a post amplifier 102, an OSC processor 43, an OSC filter 41, and a processor 85-1 as the configuration of the transmitter section. The fiber-optic communication apparatus 40-2 has an OSC filter 42, an OSC: Processor 48, a preamplifier 101, an optical splitter 49, an optical monitor 43, and a processor 45-2, as the configuration of the receiver section.

For convenience of illustration, the receiver section of the fiber-optic communication apparatus 40-1 is illustrated as having only a part of the receiver section configuration of the fiber-optic communication apparatus 40-2, and the transmitter section of the fiber-optic communication apparatus 20-2 is illustrated as having only a part of the transmitter section configuration of the fiber-optic communication apparatus 20-1. However, in the actual configuration, the fiber-optic communication apparatuses 40-1 and 40-2 have the same structure. Accordingly, the receiver section of the fiber-optic communication apparatus 40-1 has the same configuration as the receiver section of the fiber-optic communication apparatus 40-2, and the transmitter section of the fiber-optic communication apparatus 40-2 has the same configuration as the transmitter section of the fiber-optic communication apparatus 40-1. Processors 45-1 and 45-2 may be shared between the transmitter section and the receiver section.

The WDM signal and the OSC signal transmitted from the fiber-optic communication apparatus 40-1 into the fiber-optic transmission line 6 are received at the fiber-optic communication apparatus 40-2. The OSC signal is extracted by the OSC filter 42, and processed by the OSC processor 44. The WDM signal having passed through the OSC filter 42 is amplified by the preamplifier 101 and incident onto the optical splitter 49. A portion of the WDM signal is split by the optical splitter 49, and the optical powers of the respective channels are detected by the optical monitor 43. Although the optical power spectrum incident onto the optical monitor 43 contains intra-band power deviation, as well as inter-channel power deviation, as illustrated in (A) of FIG. 7, the intra-band power deviation is lost from the power spectrum detected by the optical monitor 13, as illustrated in (B) of FIG. 7.

The processor 45-2 has a received power readout part 461 and a received power transfer part 462. The received power readout part 461 reads the power spectrum detected by the optical monitor 43. The received power transfer part 462 transfers the readout power spectrum as power spectrum information to the OSC processor 43 of the transmitter section of the upstream direction. The OSC processor 43 includes the transferred power spectrum information into the supervisory signal. The supervisory signal is converted into an optical supervisory signal and transmitted to the fiber-optic transmission line 8 via the OSC filter 41. Upon reception of the OSC signal at the fiber-optic communication apparatus 40-1 from the fiber-optic transmission line 8, the OSC filter 42 extract the OSC, and the CSC processor 44 converts the OSC into an electric signal.

The processor 45-1 has a transmission power readout part 451, a wavelength dependence calculation Part 452, a wavelength dependence correction part 453, a wavelength dependence decision part 454, an attenuation setup value calculation part 455, an attenuation parameter readout part 456, an attenuation parameter update part 457, and a received power acquisition part 458.

The transmission power readout unit 451 reads the power spectrum of the WDM signal to be transmitted from the optical monitor 48. The power spectrum of the WDM signal detected by the optical monitor 48 before the transmission is in the state (B) of FIG. 7. This power spectrum is referred to as transmission power $P_{transmit}(\lambda n)$, where n is the channel number. The wavelength dependence calculation part 452 receives the transmission power $P_{transmit}(\lambda n)$ from the transmission power readout part 451. On the other hand, the received power acquisition part 458 acquires the received power $P_{receive}(\lambda n)$ from the OSC processor 44, and supplies it to the wavelength dependence calculation part 452.

The wavelength dependence calculation part 452 calculates the wavelength dependence WDL(λn) according to Formula (4), based on the transmission power $P_{tranwsmit}(\lambda n)$ and the received power $P_{receive}(\lambda n)$.

$$WDL(\lambda n) = P_{transmit}(\lambda n) - P_{receive}(\lambda n) - WDL_{average} \qquad (4)$$

where $WDL_{average} = \Sigma_{k=1}^{n}(P_{transmit}(\lambda k) - P_{receive}(\lambda k))/n$ The $WDL_{average}$ denotes the average of the differences of all the channels, each between the transmitted power $P_{transmit}(\lambda k)$ and the received power $P_{receive}(\lambda n)$ in the corresponding channel.

The wavelength dependence WDL(λn) is represented by a deviation from the all-channel average of the difference between the transmitted power $P_{transmit}$(λk) and the received power $P_{receive}$ (λk).

The wavelength dependence calculated by the wavelength dependence calculation part 452 is acquired channel by channel, and it does not reflect the intra-band power deviation. Accordingly, the wavelength dependence compensation part 453 compensates for the wavelength dependence WDL(λn) in the frequency direction. If the wavelength dependence WDL(Ln) is compensated for by linear interpolation as in the power compensation of FIG. 8, the compensated wavelength dependence WDL(Ln) is represented by Formula (5).

$$WDL(\lambda)=a\lambda+b \quad (5)$$

where "a" and "b" are constants, and "a" indicates a slope of the wavelength dependence.

The wavelength dependence decision part 454 determines whether or not the wavelength dependence is within the acceptable range, based on the compensated wavelength dependence, in unit intervals of frequency narrower than the channel bandwidth. The channel-based compensation performed by the wavelength dependence compensation part 453 is equivalent to subchannel-based compensation because the acceptability of the wavelength dependence is determined in unit intervals of frequency narrower than the channel bandwidth.

If the wavelength dependence is out of the acceptable range, the attenuation parameter currently set for the corresponding subchannel is inappropriate, and so, the attenuation setup value calculation part 455 calculates a new attenuation setup value ATTset(λ) to update the attenuation parameter. Specifically, the attenuation parameter readout part 456 reads the attenuation parameter ATT(λi) currently set in the corresponding subchannel of the add-side WSS 46, and the new attenuation setup value ATTTset(λi) is calculated by Formula (6).

$$ATTset(\lambda i)=ATT(\lambda i)-WDL(\lambda i) \quad (6)$$

where "i" denotes the subchannel index. If the WDM signal contains n channel signals and the channel bandwidth is divided into m in the frequency direction in each channel, i is an integer from 1 to m×n.

The newly calculated attenuation setup value ATTTset(λi) is applied to the corresponding frequency region of the add-side WSS 46 by the attenuation update part 457. Although in the above-described example Formulas (4), (5), and (6) are expressed as a function of wavelength, these formulas may be expressed as a function of frequency "f" based on the relationship c=λ*f using the speed of light denoted as c.

Figure 20:
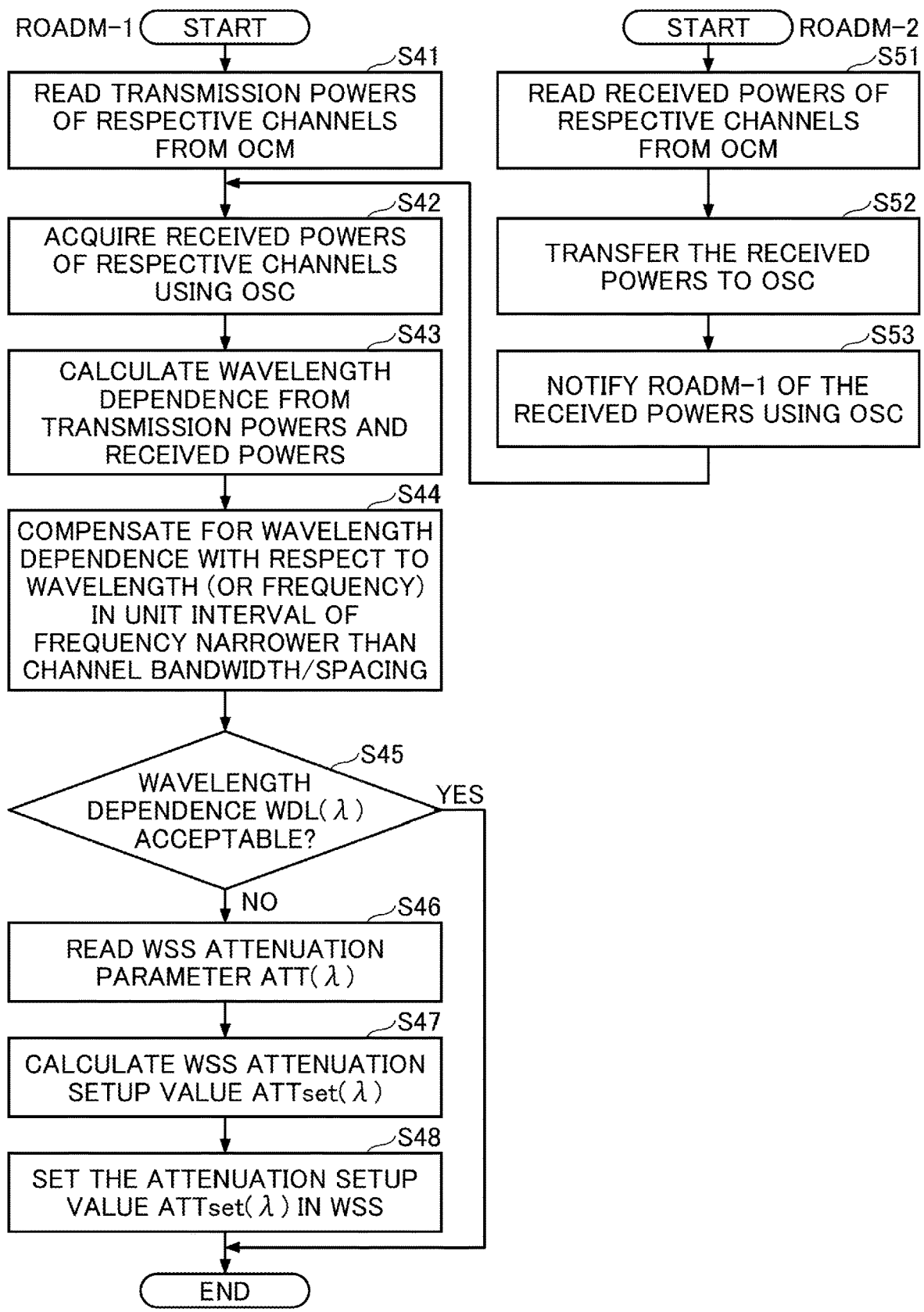
FIG. 20 is a flowchart of optical power control according to the fourth embodiment.

FIG. 20 is a flowchart of the optical power control method according to the fourth embodiment. The main part of control flow is executed by the processor 45-1 of the fiber-optic communication apparatus 40-1. The processor 45-1 reads the transmission powers of the respective channels from the optical monitor 48 (S41). On the other hand, the processor 45-2 of the fiber-optic communication apparatus 20-2 reads the received power spectrum detected by the optical monitor 43 (S51), and transfers the received power spectrum to the OSC processor 43 (S52). The fiber-optic communication apparatus 40-2 notifies the sender-side fiber-optic communication apparatus 40-1 of the received power spectrum information using the OSC.

The processor 45-1 of the fiber-optic communication apparatus 40-1 acquires the received power spectrum information from the OSC processor 44 (S42), and calculates the wavelength dependence from the transmission power and the received power on the channel basis (S43). The calculated wavelength dependence does not reflect the actual state in the channel band, and therefore, the wavelength dependence is compensated (S44). The tilt having occurred within the channel bandwidth is estimated by this compensation, and the compensation produces the same effect as correcting the wavelength dependence in unit intervals of frequency intervals narrower than the channel bandwidth.

The processor 45-1 determines whether or not the wavelength-dependent WDL(λ) is within the acceptable range in unit intervals of frequency narrower than the channel bandwidth (S45). If the wavelength dependence WDL(λ) of the frequency interval, that is, the subchannel being controlled is out of the acceptable range (NO in S45), the corresponding attenuation parameter ATT (λi) of the add-side WSS 46 is read (S46), and an attenuation setup value ATTset (λ) is calculated (547). The new attenuation setup value ATTset (λi) is applied to the corresponding frequency barad of the add-side WSS 46 to update the attenuation parameter (S48). Upon setting the appropriate attenuation parameters to all the subchannels of the add-side WSS 46, the process terminates. This control flow may be performed periodically or irregularly during service.

Thus, the wavelength dependence is compensated in unit intervals of frequency narrower than the channel bandwidth, and the attenuation parameters are controlled based on the compensated wavelength dependence. Consequently, interchannel power deviation is suppressed and simultaneously, intra-band power deviation is reduced. The similar effect illustrated in FIG. 12 can be achieved. Instead of using the attenuation ability of the add-side WSS 46, the optical power may be controlled by using another device having a power adjusting ability, for example, a dynamic gain equalizer, a wavelength blocker, or the like. Further, the 150 GHz channel bandwidth may be divided into 4 or more in the frequency direction to control the optical power with higher resolution.

Although the embodiments have been described above based on the specific configuration examples, the present disclosure is not limited to the above-described embodiments. The optical power control method of the embodiments are applicable to a 50 GHz channel bandwidth system to suppress inter-channel power deviation and intra-band power deviation. Although in the embodiments, the attenuation ability of a WSS is used to adjust the optical power level in unit intervals of frequency narrower than the channel bandwidth, a dynamic gain equalizer, a wavelength blocker, or the like may be used in place of the WSS. In the third embodiment, instead of controlling the optical power at the fiber-optic communication apparatus 30-2, the optical power may be controlled at the fiber-optic communication apparatus 30-1. In this case, the optical power monitored with high resolution by the fiber-optic communication apparatus 30-2 may be integrated in the frequency direction either by the fiber-optic communication device 30-2 or the fiber-optic communication apparatus 30-1. From the viewpoint of reducing the amount of OSC information, the power spectrum information Integrated by the fiber-optic communication apparatus 30-2 may be sent to the fiber-optic communication apparatus 30-1. In the fourth embodiment, instead of controlling the optical power at the fiber-optic communication apparatus 40-1, the optical power may be controlled by the fiber-optic communication apparatus 40-2. In this case, the fiber-optic communication apparatus 40-1 may notify the fiber-optic communication apparatus 40-2 of the transmission power spectrum information by the OSC. In the first, second, and fourth embodiments, instead of compensating the optical power spectrum detected by the optical monitor, the power spectrum incident onto the optical monitor may be detected at high resolution, and the detected power may be integrated in the frequency direction as in the third embodiment. The calculation formulas of control values are not limited to the calculation examples of the respective embodiments, and any suitable functions may be used. In either case, as the power of the WDM signal is controlled in unit intervals of frequency narrower than the channel bandwidth, both inter-channel power deviation and intra-band power deviation can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the scope of the invention.

What is claimed is:

1. A fiber-optic communication apparatus comprising:
   an optical monitor that monitors a wavelength division multiplexed (WDM) signal in which optical signals of multiple channels are multiplexed;
   a processor that calculates a control value for controlling an optical power of the WDM signal, based on a power spectrum detected by the optical monitor, in a unit interval of frequency narrower than a channel bandwidth of the WDM signal; and
   an optical power adjusting mechanism that adjusts the optical power of the WDM signal in the unit interval of frequency based on the control value.

2. The fiber-optic communication apparatus as claimed in claim 1,
   wherein the processor calculates the control value so as to reduce an intra-band power deviation in each of the multiple channels of the WDM signal.

3. The fiber-optic communication apparatus as claimed in claim 1,
   wherein the processor calculates the control value so as to reduce an inter-channel power deviation between the multiple channels of the WDM signal, and reduce an intra-band power deviation in each of the multiple channels of the WDM signal.

4. The fiber-optic communication apparatus as claimed in claim 1,
   wherein the processor compensate for the power spectrum detected by the optical monitor, and calculates the control value based on the compensated power spectrum in the unit interval of frequency narrower than the channel bandwidth.

5. The fiber-optic communication apparatus as claimed in claim 4,
   wherein the processor compares an optical power level of the compensated power spectrum with a target power level in the unit interval of frequency narrower than the channel bandwidth, and calculates the control value based on a comparison result.

6. The fiber-optic communication apparatus as claimed in claim 1,
   wherein the fiber-optic communication apparatus receives received power spectrum information from a downstream fiber-optic communication apparatus, and
   wherein the processor calculates a wavelength dependence of the WDM signal based on the power spectrum detected by the optical monitor and the received power spectrum information, and calculates the control value based on the wavelength dependence in the unit interval of frequency narrower than the channel bandwidth.

7. The fiber-optic communication apparatus as claimed in claim 6,
   wherein the processor compensates for the wavelength dependence in a frequency direction, and calculates the control value based on a compensated wavelength dependence.

8. The fiber-optic communication apparatus as claimed in claim 1,
   wherein the fiber-optic communication apparatus receives power spectrum information of an unaffected WDM signal from an upstream fiber-optic communication apparatus, the unaffected WDM signal having been added in the upstream fiber-optic communication apparatus and having not yet travelled through a fiber-optic transmission line, and
   wherein the processor calculates the control value, based on the power spectrum detected by the optical monitor and the power spectrum information received from the upstream fiber-optic communication apparatus, in the unit interval of frequency narrower than the channel bandwidth.

9. The fiber-optic communication apparatus as claimed in claim 8,
   wherein the optical monitor detects the power spectrum at frequency intervals narrower than the channel bandwidth.

10. The fiber-optic communication apparatus as claimed in claim 9,
    wherein the optical monitor detects a first power spectrum of the WDM signal at the frequency interval narrower than the unit interval of frequency, the unit interval of frequency corresponding to a control interval of the optical power adjusting mechanism, and
    wherein the processor integrates the first power spectrum in a frequency direction to produce a second power spectrum that matches the unit interval of frequency.

11. The fiber-optic communication apparatus as claimed in claim 8,
    wherein the processor calculates the control value so that the power spectrum detected by the optical monitor approaches the power spectrum information of the unaffected WDM signal.

12. The fiber-optic communication apparatus as claimed in claim 11,
    wherein the processor calculates the control value so as to minimize an inter-channel power deviation in the WDM signal received from the upstream fiber-optic communication apparatus.

13. A fiber-optic communication system comprising:
    a first fiber-optic communication apparatus;
    a second fiber-optic communication apparatus; and
    a fiber-optic transmission line connecting between the first fiber-optic communication apparatus and the second fiber-optic communication apparatus,
    wherein the first fiber-optic communication apparatus or the second fiber-optic communication apparatus compensates for a power spectrum of a WDM signal transmitted from the first fiber-optic communication apparatus and received at the second fiber-optic communication apparatus through the fiber-optic transmission line, in a unit interval of frequency narrower than a channel bandwidth of the WDM signal, and controls an optical power level of the WDM signal in the unit interval of frequency based on the compensated power spectrum.

14. A fiber-optic communication system comprising:
a first fiber-optic communication apparatus;
a second fiber-optic communication apparatus; and
a fiber-optic transmission line connecting between the first fiber-optic communication apparatus and the second fiber-optic communication apparatus,
wherein the first fiber-optic communication apparatus or the second fiber-optic communication apparatus calculates a wavelength dependence of a WDM signal, based on a transmission power spectrum of the WDM signal to be transmitted into the fiber-optic transmission line and a received power spectrum of the WDM signal received from the fiber-optic transmission line, compensates for the wavelength dependence in a unit interval of frequency narrower than a channel bandwidth of the WDM signal, and adjusts an optical power level of the WDM signal in the unit interval of frequency based on the compensated wavelength dependence.

15. A fiber-optic communication system comprising:
a first fiber-optic communication apparatus;
a second fiber-optic communication apparatus; and
a fiber-optic transmission line connecting between the first fiber-optic communication apparatus and the second fiber-optic communication apparatus,
wherein the first fiber-optic communication apparatus or the second fiber-optic communication apparatus adjusts an optical power level of a WDM signal in a unit interval of frequency narrower than a channel bandwidth of the WDM signal, based on a first power spectrum of an unaffected WDM signal having been added in the first fiber-optic communication apparatus and having not yet travelled through the fiber-optic transmission line and a second power spectrum of the WDM signal having travelled through the fiber-optic transmission line and received at the second fiber-optic communication apparatus.

16. An optical power control method comprising:
acquiring at a fiber-optic communication apparatus a power spectrum of a WDM signal in which signals of multiple channels are multiplexed;
calculating at the fiber-optic communication apparatus a control value for controlling a power level of the WDM signal, based on the power spectrum, in a unit interval of frequency narrower than a channel bandwidth of the WDM signal; and
adjusting the power level of the WDM signal in the unit interval of frequency, based on the control value.

* * * * *